United States Patent
Wang et al.

(10) Patent No.: US 10,701,585 B2
(45) Date of Patent: Jun. 30, 2020

(54) ACCESS METHOD AND APPARATUS

(71) Applicant: HUAWEI TECHNOLOGIES CO., LTD., Shenzhen, Guangdong (CN)

(72) Inventors: Yuan Wang, Shanghai (CN); Lin Shu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,844

(22) Filed: Sep. 28, 2018

(65) Prior Publication Data
US 2019/0037436 A1 Jan. 31, 2019

Related U.S. Application Data

(63) Continuation of application No. PCT/CN2016/077989, filed on Mar. 31, 2016.

(51) Int. Cl.
*H04W 28/02* (2009.01)
*H04W 72/04* (2009.01)
(Continued)

(52) U.S. Cl.
CPC ....... *H04W 28/0289* (2013.01); *H04W 48/16* (2013.01); *H04W 48/18* (2013.01);
(Continued)

(58) Field of Classification Search
CPC ..... H04W 48/18; H04W 88/02; H04W 48/16; H04W 84/042; H04W 60/00; H04W 84/00; H04W 76/10; H04W 88/08; H04W 48/08; H04W 8/065; H04W 36/12; H04W 36/14; H04W 48/20; H04W 4/06
See application file for complete search history.

(56) References Cited

U.S. PATENT DOCUMENTS 9,467,908 B2 * 10/2016 Jeong ..................... H04W 36/14
10,178,583 B2 * 1/2019 Kim ....................... H04W 28/08
(Continued)

FOREIGN PATENT DOCUMENTS

| CN | 102316600 A | 1/2012 |
| CN | 103037472 A | 4/2013 |

(Continued)

OTHER PUBLICATIONS

S2-154324 (revision of S2-153851) TeliaSonera,"Reference Architecture and Requirement Updates for Shared Networks",SA WG2 Meeting #112, Nov. 16-20, 2015, Anaheim, US,total 4 pages.
(Continued)

*Primary Examiner* — Liton Miah
(74) *Attorney, Agent, or Firm* — Fish & Richardson P.C.

(57) ABSTRACT

An access method and an apparatus are provided. After access of the terminal to the dedicated core network that is corresponding to the DCN indication information and that the terminal needs to access is rejected by the first PLMN, the terminal re-determines the second PLMN different from the first PLMN, so as to connect, by using the second PLMN, the terminal and the dedicated core network corresponding to the DCN indication information, so that the terminal can quickly access the dedicated core network. In this way, system resource utilization and user experience are improved.

10 Claims, 10 Drawing Sheets

(51) Int. Cl.
  *H04W 48/16* (2009.01)
  *H04W 88/08* (2009.01)
  *H04W 48/18* (2009.01)
  *H04W 60/00* (2009.01)
  *H04W 84/04* (2009.01)
  *H04W 88/02* (2009.01)

(52) U.S. Cl.
  CPC ........... *H04W 60/00* (2013.01); *H04W 72/04* (2013.01); *H04W 88/08* (2013.01); *H04W 84/042* (2013.01); *H04W 88/02* (2013.01)

(56) References Cited

U.S. PATENT DOCUMENTS

| | | | |
|---|---|---|---|
| 10,299,298 B2* | 5/2019 | Kim | H04W 4/70 |
| 2004/0162077 A1 | 8/2004 | Kauranen et al. | |
| 2006/0073831 A1* | 4/2006 | Guyot | H04W 36/14 455/443 |
| 2013/0114571 A1 | 5/2013 | Das et al. | |
| 2015/0237512 A1* | 8/2015 | Chang | H04W 76/10 370/328 |
| 2016/0249278 A1 | 8/2016 | Qi et al. | |
| 2016/0262045 A1* | 9/2016 | Yang | H04W 4/70 |
| 2017/0238278 A1* | 8/2017 | Yadav | H04W 28/0289 370/329 |
| 2018/0035399 A1* | 2/2018 | Xu | H04W 84/042 |
| 2018/0249318 A1* | 8/2018 | Ianev | H04W 8/065 |
| 2018/0295570 A1* | 10/2018 | Olsson | H04W 48/12 |
| 2018/0324761 A1* | 11/2018 | Velev | H04W 72/04 |
| 2019/0357130 A1* | 11/2019 | Garcia Azorero | H04W 48/18 |
| 2019/0380128 A1* | 12/2019 | Park | H04W 72/0433 |

FOREIGN PATENT DOCUMENTS

| | | |
|---|---|---|
| CN | 104041162 A | 9/2014 |
| CN | 104429126 A | 3/2015 |
| EP | 2723126 A1 | 4/2014 |
| KR | 20110091305 A | 8/2011 |
| WO | 2011072755 A1 | 6/2011 |
| WO | 20150620098 A1 | 5/2015 |
| WO | 2015167722 A1 | 11/2015 |
| WO | 2015172088 A1 | 11/2015 |

OTHER PUBLICATIONS

S2-154326 (revision of S2-153963) InterDigital,"Key Issue: Congestion Control for DCN Types",SA WG2 Meeting #112,Nov. 16-20, 2015, Anaheim, California, USA,total 2 pages.

52-153964 InterDigital,"Solution for Congestion Control based on DCN Type",SA WG2 Meeting #112,Nov. 16-20, 2015, Anaheim, California, USA,total 3 pages.

3GPP TS 36.331 V13.0.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 13),total 507 pages.

Extended European Search Report issued in European Application No. 16895946.8 dated Jan. 2, 2019, 8 pages.

International Search Report and Written Opinion issued in International Application No. PCT/CN2016/077989 dated Jan. 3, 2017, 25 pages.

InterDigital, ZTE, "Solution for Congestion Control based on DCN Type," SA WG2 Meeting #113, S2-160171; Saint Kitts, KN, Jan. 25-29, 2016, 3 pages.

3GPP TR 23.711 V0.3.0 (2016-01), "3rd Generation Partnership Project; Technical Specification Group Services and System Aspects; Enhancements of Dedicated Core Networks selection mechanism; (Release 14)," Jan. 2016, 31 pages.

Ericsson, "Redirection at UE Initiated Initial Access," SA WG2 Meeting #107, S2-150079; Sorrento, Italy, Jan. 26-30, 2015, 7 pages.

Office Action issued in Chinese Application No. 201680084300.X on Apr. 15, 2020, 19 pages (with English translation).

* cited by examiner

ACCESS METHOD AND APPARATUS

CROSS-REFERENCE TO RELATED APPLICATIONS

This application is a continuation of International Application No. PCT/CN2016/077989, filed on Mar. 31, 2016, the disclosure of which is hereby incorporated by reference in its entirety.

TECHNICAL FIELD

This application relates to the field of mobile communications technologies, and in particular, to an access method and an apparatus.

BACKGROUND

With evolution of a mobile communications network and continuous emergence of a large quantity of new applications, different users gradually form different communication features in different application fields, and therefore different communication types are generated, for example, machine type communication (Machine Type Communication, MTC for short), mobile virtual network communication, and public safety communication. Currently, operators put forward a requirement for deploying different dedicated core networks (Dedicated Core Network, DCN) for different communication types. The operators subscribe to one type of dedicated core network (DCN) for terminals that support a same communication type, and deploy a special core network element for the terminals, so that the terminals that support the same DCN register with the core network element specially deployed for the terminals. This helps the operators perform specific management and maintenance on terminals that support different DCNs, so as to improve efficiency in accessing a network by a terminal, and reduce network maintenance costs.

Based on a current plan of the 3rd Generation Partnership Project (3rd Generation Partnership Project, 3GPP for short), a plurality of different types of DCNs may be simultaneously configured for one core network element in a public land mobile network (Public Land Mobile Network, PLMN for short). In addition, to avoid extremely heavy load on the core network element, a backoff policy is used when congestion occurs in the network. Specifically, when congestion occurs in the network, a network side may determine to perform congestion control on a DCN in a plurality of currently supported DCNs. In this case, if a terminal that supports the DCN on which congestion control is performed initiates a radio connection request for accessing the network, the terminal is rejected by a radio access network node (Radio Access Network Node, RAN Node), and thereby is unable to access the network, so that network load is alleviated. In addition, the RAN node specifies a time for which the terminal needs to back off. After waiting for the backoff time specified by the RAN node, the terminal re-initiates a radio connection request, to attempt to re-access the network.

In the foregoing solution, when network congestion is serious, after backing off and waiting a plurality of times, the terminal may be still unable to access the network. Consequently, a service of the terminal cannot be carried out, and user service experience is accordingly degraded.

SUMMARY

Embodiments of this application provide an access method and an apparatus, so that a terminal can quickly access a network when network congestion occurs.

An embodiment of this application provides an access method, including:

obtaining, by a terminal, first dedicated core network DCN information;

determining, by the terminal, a first public land mobile network PLMN based on the first DCN information and dedicated core network DCN indication information, and sending a first access request to the first PLMN, where the first access request includes the DCN indication information, and the first access request is used to request to access a dedicated core network that is corresponding to the DCN indication information and that is in the first PLMN;

receiving, by the terminal, an access reject message sent by the first PLMN, where the access reject message is used to reject access of the terminal to the dedicated core network that is corresponding to the DCN indication information and that is in the first PLMN; and determining, by the terminal, a second PLMN based on the DCN indication information, and sending a second access request to the second PLMN, where the second access request includes the DCN indication information, and the second access request is used to request to access a dedicated core network that is corresponding to the DCN indication information and that is in the second PLMN.

According to the method provided in this embodiment of this application, after access of the terminal to the dedicated core network that is corresponding to the DCN indication information and that the terminal needs to access is rejected by the first PLMN, the terminal re-determines the second PLMN different from the first PLMN, so as to connect, by using the second PLMN, the terminal and the dedicated core network corresponding to the DCN indication information, so that the terminal can quickly access the dedicated core network. In this way, system resource utilization and user experience are improved.

Optionally, the obtaining, by a terminal, first dedicated core network DCN information includes:

receiving, by the terminal, the first DCN information sent by a radio access network node in the first PLMN, where the first DCN information includes N DCN identifier lists and N PLMN identifiers corresponding to the N DCN identifier lists, any PLMN identifier is used to indicate a PLMN to which a DCN identifier list corresponding to the PLMN identifier belongs, and N is a natural number.

Optionally, the determining, by the terminal, a second PLMN based on the DCN indication information includes:

determining, by the terminal from the N DCN identifier lists, all DCN identifier lists that include a DCN identifier indicated by the DCN indication information; and selecting, by the terminal, a PLMN identifier from PLMN identifiers corresponding to all the DCN identifier lists that include the DCN identifier indicated by the DCN indication information, and determining the second PLMN based on the selected PLMN identifier.

According to the method provided in this embodiment of this application, the terminal may determine a PLMN identifier from the N DCN identifier lists, so that after access of the terminal is rejected by the first PLMN, the terminal can quickly determine the second PLMN that needs to be accessed.

Optionally, before the determining, by the terminal, a second PLMN based on the DCN indication information, the method further includes:

receiving, by the terminal, second DCN information sent by a radio access network node in the second PLMN, where the second DCN information includes M DCN identifier lists and M PLMN identifiers corresponding to the M DCN identifier lists, and M is a natural number; and the determining, by the terminal, a second PLMN based on the DCN indication information includes:

determining, by the terminal from the M DCN identifier lists, all DCN identifier lists that include a DCN identifier indicated by the DCN indication information; and selecting, by the terminal, a PLMN identifier from PLMN identifiers corresponding to all the DCN identifier lists that include the DCN identifier indicated by the DCN indication information, and determining the second PLMN based on the selected PLMN identifier.

According to the method provided in this embodiment of this application, after access of the terminal is rejected by the first PLMN, the terminal may determine a PLMN identifier based on the second DCN information sent by the radio access network node in the second PLMN, so that the second PLMN that needs to be accessed can be quickly determined.

Optionally, the access reject message includes a PLMN identifier list, and the PLMN identifier list is used to instruct the terminal to select a PLMN identifier from the PLMN identifier list; and the selecting, by the terminal, a PLMN identifier from PLMN identifiers corresponding to all the DCN identifier lists that include the DCN identifier indicated by the DCN indication information includes:

selecting, by the terminal from the PLMN identifiers corresponding to all the DCN identifier lists that include the DCN identifier indicated by the DCN indication information, a PLMN identifier that is in the PLMN identifier list.

Optionally, the access reject message includes an access reject reason identifier, and the access reject reason identifier is used to indicate a reason for rejecting access of the terminal to the dedicated core network; and before the determining a second PLMN based on the DCN indication information, the method further includes:

determining, by the terminal based on the access reject reason identifier, that the first PLMN is performing congestion control on the dedicated core network corresponding to the DCN indication information.

Optionally, the second access request further includes a redirection permission identifier; and the redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

Optionally, the DCN indication information is a dedicated core network identifier; or the DCN indication information is a dedicated core network type; or the DCN indication information is a dedicated core network type identifier.

An embodiment of this application provides an access method, including:

receiving, by a radio access network node, an access request sent by a terminal, where the access request includes dedicated core network DCN indication information, and the access request is used to instruct the radio access network node to connect the terminal and a dedicated core network that is corresponding to the DCN indication information and that is in a first public land mobile network PLMN; and if the radio access network node determines that a first core network node that is corresponding to the dedicated core network and that is in the first PLMN rejects access of the terminal to the dedicated core network corresponding to the DCN indication information, determining, by the radio access network node, a second PLMN based on the DCN indication information, and connecting, the terminal and a dedicated core network that is corresponding to the DCN indication information and that is in the second PLMN.

Optionally, that the radio access network node determines that a first core network node that is corresponding to the dedicated core network and that is in the first PLMN rejects access of the terminal to the dedicated core network includes:

sending, by the radio access network node, the DCN indication information to the first core network node; and if the radio access network node receives a service reject message sent by the first core network node, determining, by the radio access network node, that the first core network node rejects access of the terminal to the dedicated core network, where the service reject message is sent by the first core network node after the first core network node determines that congestion control is being performed on the dedicated core network corresponding to the DCN indication information.

Optionally, before the receiving, by a radio access network node, an access request sent by a terminal, the method further includes:

receiving, by the radio access network node, a congestion control message that includes a congestion control DCN identifier list and that is sent by the first core network node, where the congestion control DCN identifier list is used to instruct the radio access network node to reject access of the terminal to a dedicated core network corresponding to a DCN identifier in the congestion control DCN identifier list; and that the radio access network node determines that a first core network node that is corresponding to the dedicated core network and that is in the first PLMN rejects access of the terminal to the dedicated core network corresponding to the DCN indication information includes:

if the radio access network node determines that a DCN identifier of the dedicated core network corresponding to the DCN indication information is in the congestion control DCN identifier list, determining, by the radio access network node, that the first core network node rejects access of the terminal to the dedicated core network corresponding to the DCN indication information.

Optionally, the determining a second PLMN based on the DCN indication information includes:

determining, by the radio access network node from N DCN identifier lists, all DCN identifier lists that include a DCN identifier indicated by the DCN indication information, where the N DCN identifier lists are obtained by the radio access network node based on N pieces of received DCN registration information sent by N core network nodes, each piece of DCN registration information includes a PLMN identifier of a core network node that sends the DCN registration information and a DCN identifier list of the core network node, and N is a natural number; and selecting, by the radio access network node, a PLMN identifier from PLMN identifiers corresponding to all the DCN identifier lists that include the DCN identifier indicated by the DCN indication information, and determining the second PLMN based on the selected PLMN identifier.

Optionally, before the determining a second PLMN based on the DCN indication information, the method further includes:

receiving, by the radio access network node, a PLMN identifier list sent by the first core network node, where the PLMN identifier list is used to instruct the radio access network node to select a PLMN identifier from the PLMN identifier list; and the selecting, by the radio access network node, a PLMN identifier from PLMN identifiers corresponding to all the DCN identifier lists that include the DCN identifier indicated by the DCN indication information includes:

selecting, by the radio access network node from the PLMN identifiers corresponding to all the DCN identifier lists that include the DCN identifier indicated by the DCN indication information, a PLMN identifier that is in the PLMN identifier list.

Optionally, the access request further includes a redirection permission identifier, and the redirection permission identifier is used to indicate whether the terminal has permission to access, in a cross-PLMN manner, the dedicated core network corresponding to the DCN indication information.

Optionally, before the determining a second PLMN based on the DCN indication information, the method further includes:

determining, by the radio access network node based on the redirection permission identifier, that the terminal has the permission to access the DCN in the cross-PLMN manner.

Optionally, after the determining a second PLMN based on the DCN indication information, the method further includes:

forwarding, by the radio access network node, the redirection permission identifier to a second core network node that is corresponding to the dedicated core network corresponding to the DCN indication information and that is in the second PLMN, so that after determining, based on the redirection permission identifier, that the terminal has the permission to access, in the cross-PLMN manner, the dedicated core network corresponding to the DCN indication information, the second core network node connects the terminal and the dedicated core network.

Optionally, the DCN indication information is a dedicated core network identifier; or the DCN indication information is a dedicated core network type; or the DCN indication information is a dedicated core network type identifier.

An embodiment of this application provides a terminal, including:

a transceiver unit, configured to obtain first dedicated core network DCN information; and a processing unit, configured to: determine a first public land mobile network PLMN based on the first DCN information and dedicated core network DCN indication information, and send a first access request to the first PLMN by using the transceiver unit, where the first access request includes the DCN indication information, and the first access request is used to request to access a dedicated core network that is corresponding to the DCN indication information and that is in the first PLMN, where the transceiver unit is configured to receive an access reject message sent by the first PLMN, where the access reject message is used to reject access of the terminal to the dedicated core network that is corresponding to the DCN indication information and that is in the first PLMN; and the processing unit is configured to: determine a second PLMN based on the DCN indication information, and send a second access request to the second PLMN by using the transceiver unit, where the second access request includes the DCN indication information, and the second access request is used to request to access a dedicated core network that is corresponding to the DCN indication information and that is in the second PLMN.

Optionally, the transceiver unit is specifically configured to:

receive the first DCN information sent by a radio access network node in the first PLMN, where the first DCN information includes N DCN identifier lists and N PLMN identifiers that have a correspondence, any PLMN identifier is used to indicate a PLMN to which a DCN identifier list corresponding to the PLMN identifier belongs, and N is a natural number.

Optionally, the processing unit is specifically configured to:

determine, from the N DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver unit is further configured to:

receive second DCN information sent by a radio access network node in the second PLMN, where the second DCN information includes M DCN identifier lists and M PLMN identifiers corresponding to the M DCN identifier lists, and M is a natural number; and the processing unit is specifically configured to:

determine, from the M DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, the access reject message includes a PLMN identifier list, and the PLMN identifier list is used to instruct the terminal to select a PLMN identifier from the PLMN identifier list; and the processing unit is specifically configured to:

select, from the PLMN identifiers corresponding to all the DCN identifier lists that include the DCN identifier indicated by the DCN indication information, a PLMN identifier that is in the PLMN identifier list.

Optionally, the access reject message includes an access reject reason identifier, and the access reject reason identifier is used to indicate a reason for rejecting access of the terminal to the dedicated core network; and before determining the second PLMN based on the DCN indication information, the processing unit is further configured to:

determine, based on the access reject reason identifier, that the first PLMN is performing congestion control on the dedicated core network corresponding to the DCN indication information.

Optionally, the second access request further includes a redirection permission identifier; and the redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

Optionally, the DCN indication information is a dedicated core network identifier; or the DCN indication information is a dedicated core network type; or the DCN indication information is a dedicated core network type identifier.

An embodiment of this application provides a radio access network node, including:

a transceiver unit, configured to receive an access request sent by a terminal, where the access request includes dedicated core network DCN indication information, and the access request is used to instruct the radio access network node to connect the terminal and a dedicated core network that is corresponding to the DCN indication information and that is in a first public land mobile network PLMN; and a processing unit, configured to: if a first core network node that is corresponding to the dedicated core network and that is in the first PLMN rejects access of the terminal to the dedicated core network corresponding to the DCN indication information, determine a second PLMN based on the DCN indication information, and connect the terminal and a dedicated core network that is corresponding to the DCN indication information and that is in the second PLMN.

Optionally, the processing unit is specifically configured to:

send the DCN indication information to the first core network node by using the transceiver unit; and if a service reject message sent by the first core network node is received, determine that the first core network node rejects access of the terminal to the dedicated core network, where the service reject message is sent by the first core network node after the first core network node determines that congestion control is being performed on the dedicated core network corresponding to the DCN indication information.

Optionally, before receiving the access request sent by the terminal, the transceiver unit is further configured to:

receive a congestion control message that includes a congestion control DCN identifier list and that is sent by the first core network node, where the congestion control DCN identifier list is used to instruct the radio access network node to reject access of the terminal to a dedicated core network corresponding to a DCN identifier in the congestion control DCN identifier list; and the processing unit is further configured to:

if a DCN identifier of the dedicated core network corresponding to the DCN indication information is in the congestion control DCN identifier list, determine that the first core network node rejects access of the terminal to the dedicated core network corresponding to the DCN indication information.

Optionally, the processing unit is specifically configured to:

determine, from N DCN identifier lists, all DCN identifier lists that include a DCN identifier indicated by the DCN indication information, where the N DCN identifier lists are obtained by the radio access network node based on N pieces of received DCN registration information sent by N core network nodes, each piece of DCN registration information includes a PLMN identifier of a core network node that sends the DCN registration information and a DCN identifier list of the core network node, and N is a natural number; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver unit is further configured to:

receive a PLMN identifier list sent by the first core network node, where the PLMN identifier list is used to instruct the radio access network node to select a PLMN identifier from the PLMN identifier list; and the processing unit is further configured to:

select, from the PLMN identifiers corresponding to all the DCN identifier lists that include the DCN identifier indicated by the DCN indication information, a PLMN identifier that is in the PLMN identifier list.

Optionally, the access request further includes a redirection permission identifier, and the redirection permission identifier is used to indicate whether the terminal has permission to access, in a cross-PLMN manner, the dedicated core network corresponding to the DCN indication information.

Optionally, before determining the second PLMN based on the DCN indication information, the processing unit is further configured to:

determine, based on the redirection permission identifier, that the terminal has the permission to access the DCN in the cross-PLMN manner.

Optionally, after the second PLMN is determined based on the DCN indication information, the transceiver unit is further configured to:

forward the redirection permission identifier to a second core network node that is corresponding to the dedicated core network corresponding to the DCN indication information and that is in the second PLMN, so that after determining, based on the redirection permission identifier, that the terminal has the permission to access, in the cross-PLMN manner, the dedicated core network corresponding to the DCN indication information, the second core network node connects the terminal and the dedicated core network.

Optionally, the DCN indication information is a dedicated core network identifier; or the DCN indication information is a dedicated core network type; or the DCN indication information is a dedicated core network type identifier.

An embodiment of this application provides a terminal, including:

a transceiver, configured to obtain first dedicated core network DCN information; and a processor, configured to: determine a first public land mobile network PLMN based on the first DCN information and dedicated core network DCN indication information, and send a first access request to the first PLMN by using the transceiver, where the first access request includes the DCN indication information, and the first access request is used to request to access a dedicated core network that is corresponding to the DCN indication information and that is in the first PLMN, where the transceiver is configured to receive an access reject message sent by the first PLMN, where the access reject message is used to reject access of the terminal to the dedicated core network that is corresponding to the DCN indication information and that is in the first PLMN; and the processor is configured to: determine a second PLMN based on the DCN indication information, and send a second access request to the second PLMN by using the transceiver, where the second access request includes the DCN indication information, and the second access request is used to request to access a dedicated core network that is corresponding to the DCN indication information and that is in the second PLMN.

Optionally, the transceiver is specifically configured to:

receive the first DCN information sent by a radio access network node in the first PLMN, where the first DCN information includes N DCN identifier lists and N PLMN identifiers that have a correspondence, any PLMN identifier is used to indicate a PLMN to which a DCN identifier list corresponding to the PLMN identifier belongs, and N is a natural number.

Optionally, the processor is specifically configured to:

determine, from the N DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver is further configured to:

receive second DCN information sent by a radio access network node in the second PLMN, where the second DCN information includes M DCN identifier lists and M PLMN identifiers corresponding to the M DCN identifier lists, and M is a natural number; and the processor is specifically configured to:

determine, from the M DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, the access reject message includes a PLMN identifier list, and the PLMN identifier list is used to instruct the terminal to select a PLMN identifier from the PLMN identifier list; and the processor is specifically configured to:

select, from the PLMN identifiers corresponding to all the DCN identifier lists that include the DCN identifier indicated by the DCN indication information, a PLMN identifier that is in the PLMN identifier list.

Optionally, the access reject message includes an access reject reason identifier, and the access reject reason identifier is used to indicate a reason for rejecting access of the terminal to the dedicated core network; and before determining the second PLMN based on the DCN indication information, the processor is further configured to:

determine, based on the access reject reason identifier, that the first PLMN is performing congestion control on the dedicated core network corresponding to the DCN indication information.

Optionally, the second access request further includes a redirection permission identifier; and the redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

Optionally, the DCN indication information is a dedicated core network identifier; or the DCN indication information is a dedicated core network type; or the DCN indication information is a dedicated core network type identifier.

An embodiment of this application provides a radio access network node, including:

a transceiver, configured to receive an access request sent by a terminal, where the access request includes dedicated core network DCN indication information, and the access request is used to instruct the radio access network node to connect the terminal and a dedicated core network that is corresponding to the DCN indication information and that is in a first public land mobile network PLMN; and a processor, configured to: if a first core network node that is corresponding to the dedicated core network and that is in the first PLMN rejects access of the terminal to the dedicated core network corresponding to the DCN indication information, determine a second PLMN based on the DCN indication information, and connect the terminal and a dedicated core network that is corresponding to the DCN indication information and that is in the second PLMN.

Optionally, the processor is specifically configured to:

send the DCN indication information to the first core network node by using the transceiver; and if a service reject message sent by the first core network node is received, determine that the first core network node rejects access of the terminal to the dedicated core network, where the service reject message is sent by the first core network node after the first core network node determines that congestion control is being performed on the dedicated core network corresponding to the DCN indication information.

Optionally, before receiving the access request sent by the terminal, the transceiver is further configured to:

receive a congestion control message that includes a congestion control DCN identifier list and that is sent by the first core network node, where the congestion control DCN identifier list is used to instruct the radio access network node to reject access of the terminal to a dedicated core network corresponding to a DCN identifier in the congestion control DCN identifier list; and the processor is further configured to:

if a DCN identifier of the dedicated core network corresponding to the DCN indication information is in the congestion control DCN identifier list, determine that the first core network node rejects access of the terminal to the dedicated core network corresponding to the DCN indication information.

Optionally, the processor is specifically configured to:

determine, from N DCN identifier lists, all DCN identifier lists that include a DCN identifier indicated by the DCN indication information, where the N DCN identifier lists are obtained by the radio access network node based on N pieces of received DCN registration information sent by N core network nodes, each piece of DCN registration information includes a PLMN identifier of a core network node that sends the DCN registration information and a DCN identifier list of the core network node, and N is a natural number; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver is further configured to:

receive a PLMN identifier list sent by the first core network node, where the PLMN identifier list is used to instruct the radio access network node to select a PLMN identifier from the PLMN identifier list; and the processor is further configured to:

select, from the PLMN identifiers corresponding to all the DCN identifier lists that include the DCN identifier indicated by the DCN indication information, a PLMN identifier that is in the PLMN identifier list.

Optionally, the access request further includes a redirection permission identifier, and the redirection permission identifier is used to indicate whether the terminal has permission to access, in a cross-PLMN manner, the dedicated core network corresponding to the DCN indication information.

Optionally, before determining the second PLMN based on the DCN indication information, the processor is further configured to:

determine, based on the redirection permission identifier, that the terminal has the permission to access the DCN in the cross-PLMN manner.

Optionally, after the second PLMN is determined based on the DCN indication information, the transceiver is further configured to:

forward the redirection permission identifier to a second core network node that is corresponding to the dedicated core network corresponding to the DCN indication information and that is in the second PLMN, so that after determining, based on the redirection permission identifier, that the terminal has the permission to access, in the cross-PLMN manner, the dedicated core network corresponding to the DCN indication information, the second core network node connects the terminal and the dedicated core network.

Optionally, the DCN indication information is a dedicated core network identifier; or the DCN indication information is a dedicated core network type; or the DCN indication information is a dedicated core network type identifier.

DESCRIPTION OF EMBODIMENTS

The following further describes in detail the embodiments of this application with reference to the accompanying drawings.

The embodiments of this application may be applied to various cellular mobile networks such as LTE (Long Term Evolution, Long Term Evolution), a GSM (Global System for Mobile Communications, Global System for Mobile Communications), CDMA (Code Division Multiple Access, Code Division Multiple Access), and a UMTS (Universal Mobile Telecommunications System, Universal Mobile Telecommunications System).

A terminal in the embodiments of this application may be a device (device) providing voice and/or data connectivity for a user, and may be a wireless terminal or a wired terminal. When the terminal is a wireless terminal, the terminal may be a handheld device with a wireless connection function, another processing device connected to a wireless modem, or a mobile terminal that communicates with one or more core networks by using a radio access network. For example, the wireless terminal may be a mobile phone (or referred to as a "cellular" phone) and a computer with a mobile terminal. For another example, the wireless terminal may also be a portable, pocket-sized, handheld, computer built-in, or in-vehicle mobile apparatus. For still another example, the wireless terminal may be a part of a mobile station (English: mobile station), an access point (English: access point), user equipment (English: user equipment, UE for short), or the like.

In the embodiments of this application, a radio access network node may be a NodeB (NodeB), or may be a device such as an eNodeB (E-UTRAN NodeB, E-UTRAN NodeB). The radio access network node may be shared by a plurality of PLMNs. In this case, the radio access network node may be corresponding to a plurality of core network nodes that belong to different PLMNs. Alternatively, the radio access network node may be exclusive to one PLMN. In this case, the radio access network node may be corresponding to a core network node in only one PLMN.

Figure 1:
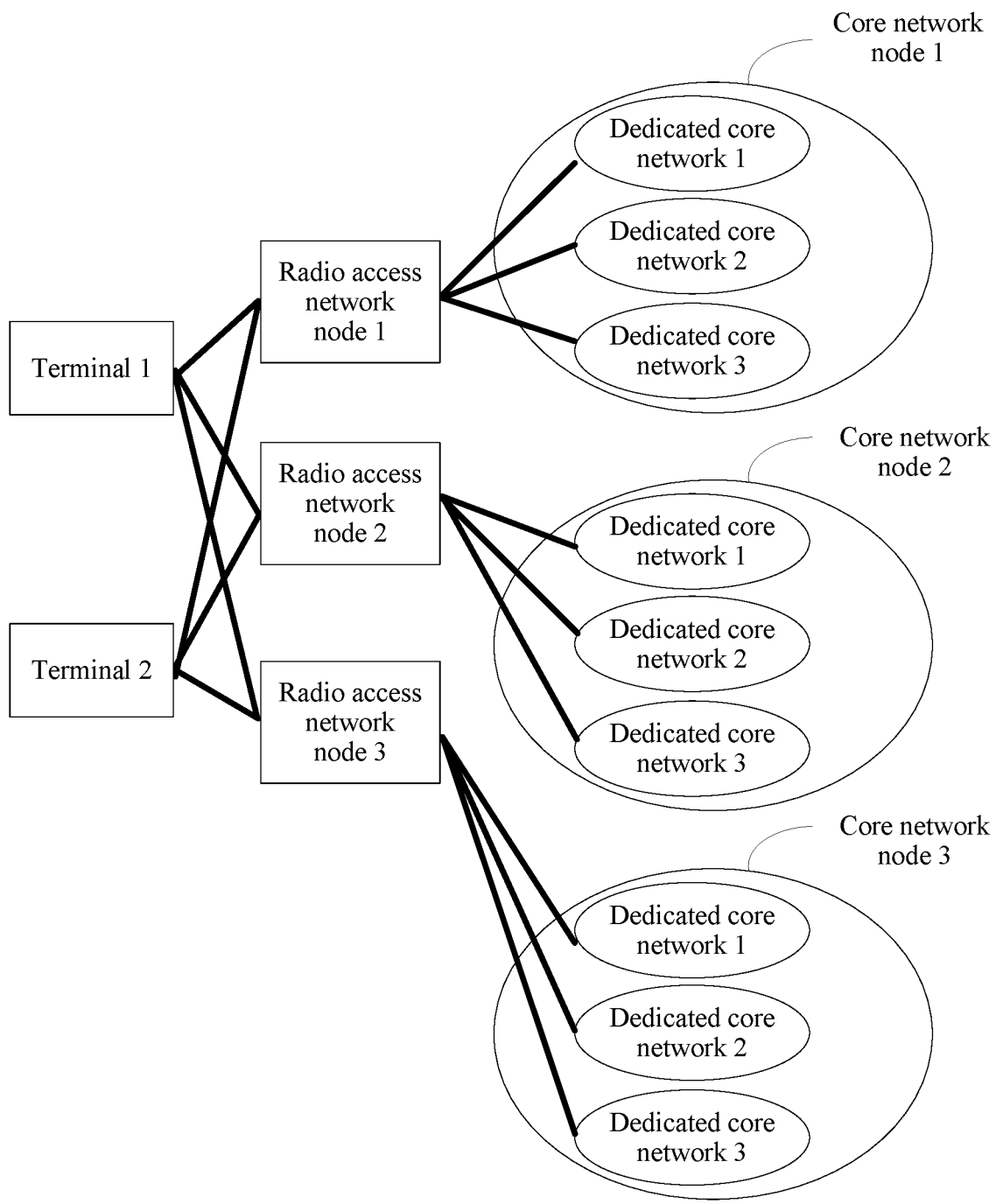
FIG. 1 is a schematic diagram of a network architecture according to an embodiment of this application.

In the embodiments of this application, a core network node may be an MME (Mobility Management Entity, mobility management entity), or may be a device such as an SGSN (Serving GPRS Support Node, serving GPRS support node). The core network node may support at least one type of DCN With reference to the foregoing description, as shown in FIG. 1, FIG. 1 is a schematic diagram of a network architecture according to an embodiment of this application. In FIG. 1, one radio access network node is exclusive to one PLMN. Specifically, a radio access network node 1 is corresponding to a core network node 1 in a PLMN 1, a radio access network node 2 is corresponding to a core network node 2 in a PLMN 2, and a radio access network node 3 is corresponding to a core network node 3 in a PLMN 3. Each core network node supports three types of DCNs that are respectively a dedicated core network 1 to a dedicated core network 3. A terminal 1 and a terminal 2 each may be connected to any radio access network node, and instruct the connected radio access network node to connect the terminal and a DCN that the terminal needs to access.

Figure 2:
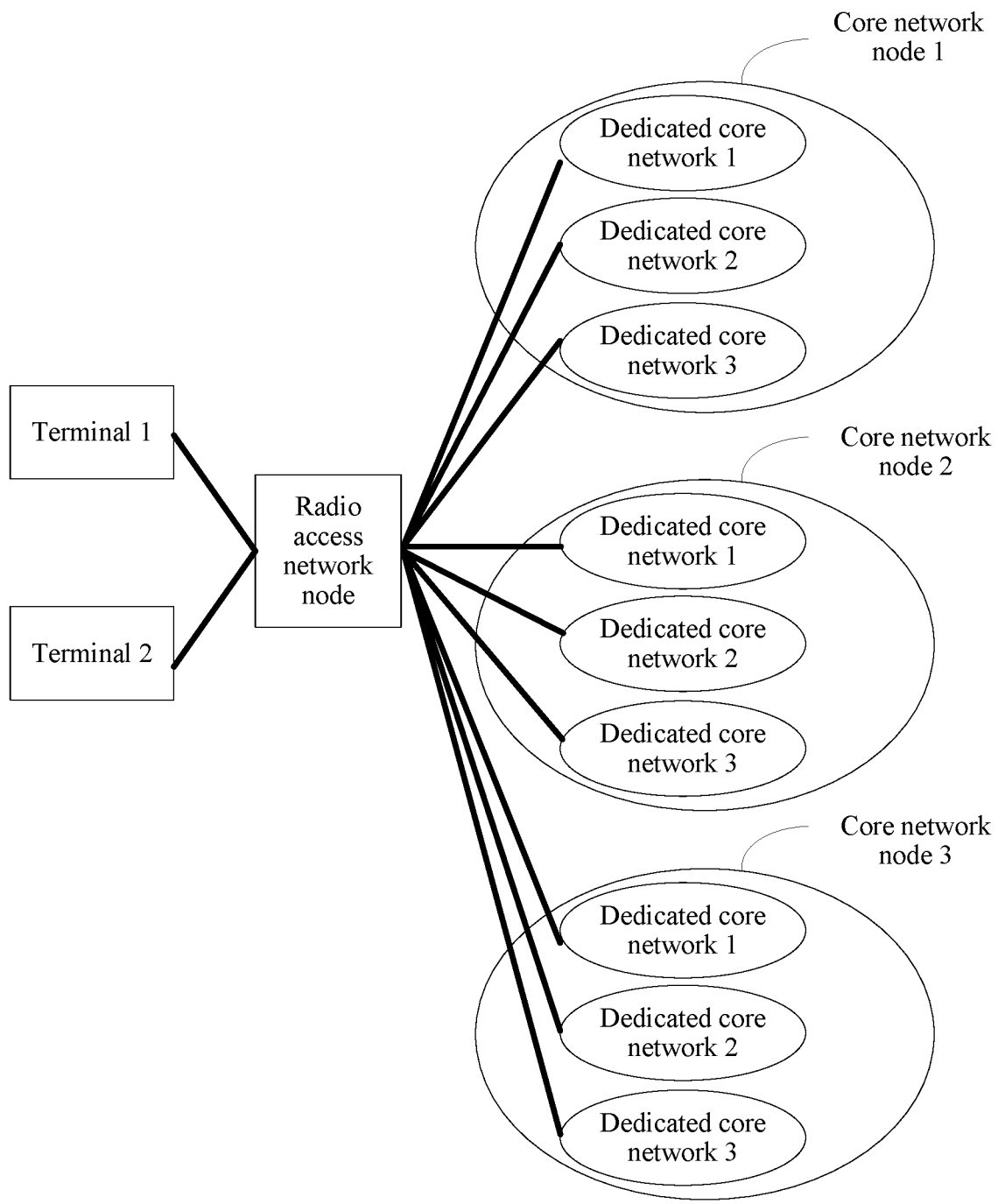
FIG. 2 is a schematic diagram of another network architecture according to an embodiment of this application.

As shown in FIG. 2, FIG. 2 is a schematic diagram of another network architecture according to an embodiment of this application. In FIG. 2, one radio access network node is shared by a plurality of PLMNs. Specifically, the radio access network node is corresponding to a core network node 1 in a PLMN 1, a core network node 2 in a PLMN 2, and a core network node 3 in a PLMN 3. Each core network node supports three types of DCNs that are respectively a dedicated core network 1 to a dedicated core network 3. A terminal 1 and a terminal 2 each may be connected to the radio access network node, and instruct the radio access network node to connect the terminal and a DCN that the terminal needs to access.

In the embodiments of this application, a core network node needs to send DCN registration information to a radio access network node corresponding to the core network node. The DCN registration information may include information such as a DCN identifier list and a PLMN identifier. The DCN identifier list includes DCN identifiers of all DCNs supported by the core network node. The PLMN identifier is an identifier of a PLMN to which the core network node belongs, and is used to indicate a PLMN to which the DCN identifier list belongs. The DCN registration information may further include an MME group identifier (Group identifier, Group ID), an SGSN group ID, or the like. This is not limited in the embodiments of this application.

A radio access network node may broadcast obtained information such as a DCN identifier list and a PLMN identifier of each core network node, so that a terminal can select a first PLMN based on the information broadcast by the radio access network node, and accordingly the terminal accesses a dedicated core network that needs to be accessed. For example, the radio access network node may broadcast the obtained information such as the DCN identifier list and the PLMN identifier of each core network node by using a SIB (System Information Block, system information block) message. Alternatively, the radio access network node may separately send, to each terminal, the information obtained by the radio access network node, such as the DCN identifier list and the PLMN identifier of each core network node, for example, send, to the terminal by using RRC (Radio Resource Control, radio resource control) signaling, the information obtained by the radio access network node, such as the DCN identifier list and the PLMN identifier of each core network node.

Figure 3:
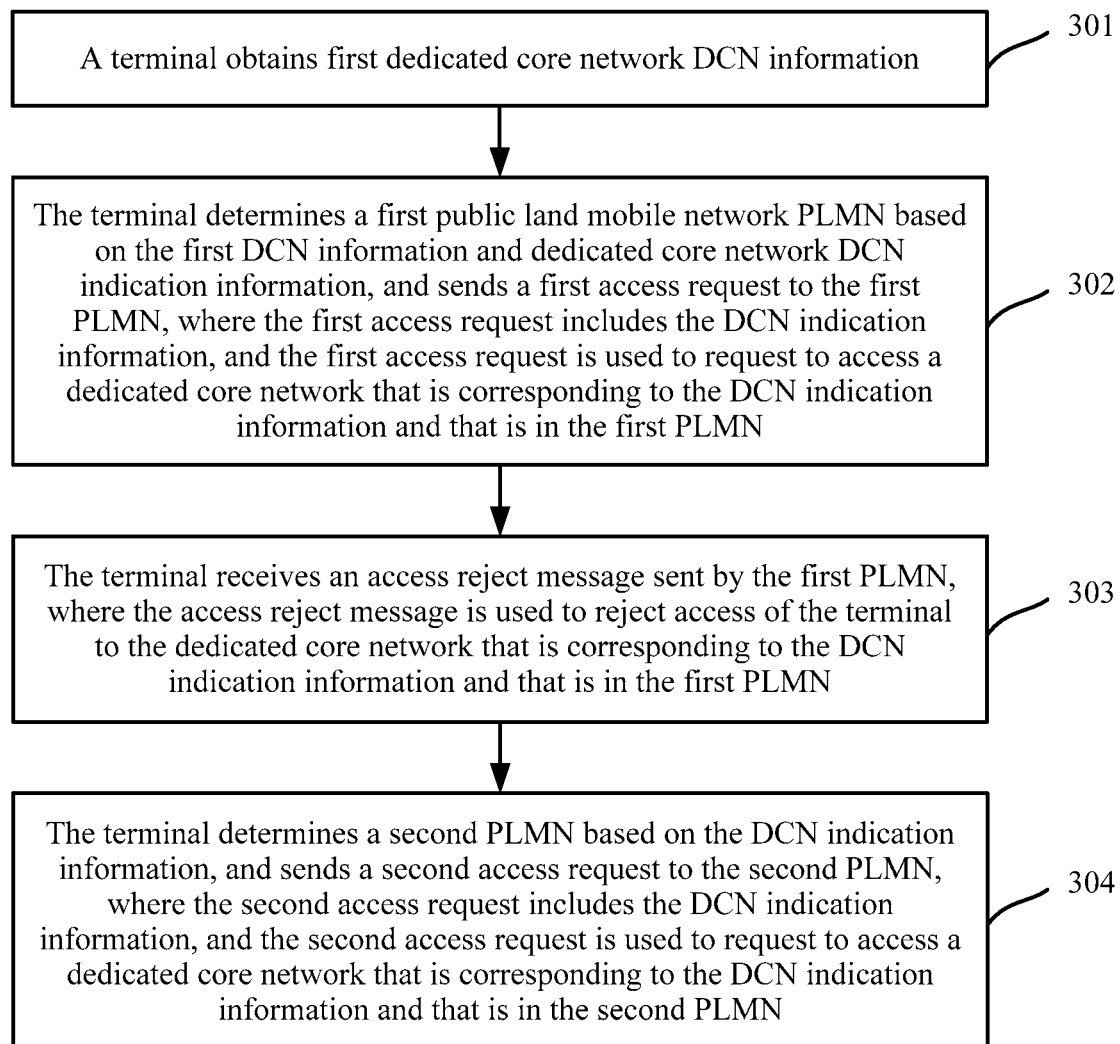
FIG. 3 is a schematic flowchart of an access method according to an embodiment of this application.

Based on the foregoing description, as shown in FIG. 3, an embodiment of this application provides a schematic flowchart of an access method. The method includes the following steps:

Step 301: A terminal obtains first dedicated core network DCN information.

Step 302: The terminal determines a first public land mobile network PLMN based on the first DCN information and dedicated core network DCN indication information, and sends a first access request to the first PLMN, where the first access request includes the DCN indication information, and the first access request is used to request to access a dedicated core network that is corresponding to the DCN indication information and that is in the first PLMN.

Step 303: The terminal receives an access reject message sent by the first PLMN, where the access reject message is used to reject access of the terminal to the dedicated core network that is corresponding to the DCN indication information and that is in the first PLMN.

Step 304: The terminal determines a second PLMN based on the DCN indication information, and sends a second access request to the second PLMN, where the second access request includes the DCN indication information, and the second access request is used to request to access a dedicated core network that is corresponding to the DCN indication information and that is in the second PLMN.

In step 301, the terminal may obtain the first DCN information by using a radio access network node in the first PLMN. Specifically, the terminal may receive the first DCN information sent by the radio access network node in the first PLMN.

For example, the terminal may obtain the first DCN information by using a SIB message broadcast by the radio access network node in the first PLMN, or the terminal may obtain the first DCN information by using RRC signaling sent by the radio access network node in the first PLMN.

It should be noted that, in this embodiment of this application, before sending the first DCN information, the radio access network node in the first PLMN may receive DCN registration information sent by at least one core network node. DCN registration information sent by each core network node includes a PLMN identifier and a DCN identifier list of the core network node. The PLMN identifier is used to indicate a PLMN to which the core network node belongs, and the DCN identifier list is used to indicate all DCNs supported by the core network node. In this way, the radio access network node in the first PLMN may generate the first DCN information based on at least one piece of received DCN registration information.

The first DCN information obtained by the terminal includes N DCN identifier lists and N PLMN identifiers that have a correspondence, any PLMN identifier is used to indicate a PLMN to which a DCN identifier list corresponding to the PLMN identifier belongs, and N is a natural number.

In step 302, after the terminal receives the first DCN information, if the terminal determines that a DCN identifier list that includes a DCN identifier indicated by the DCN indication information exists in the first DCN information, the terminal determines to send the first access request to the first PLMN.

In this embodiment of this application, the first access request sent by the terminal may be an RRC connection setup complete (RRC Connection Setup Complete) message. The RRC connection setup complete message may include a NAS (Non-access Stratum, non-access stratum) request message, a DCN identifier, and the like. The NAS request message may be an attach request (Attach request) message, a tracking area update (Tracking Area Update, TAU) request message, a routing area update (Routing Area Update, RAU) request message, or the like.

In this embodiment of this application, the DCN indication information may be implemented in a plurality of forms. For example, the DCN indication information may be a dedicated core network identifier, or the DCN indication information may be a dedicated core network type, or the DCN indication information may be a dedicated core network type identifier. Certainly, alternatively, the DCN indication information may be implemented in another form. Details are not described herein.

The DCN indication information may be preconfigured in the terminal. Alternatively, the terminal may obtain the DCN indication information in another manner. For example, the DCN indication information is delivered by a PLMN to the terminal.

It should be noted that, before sending the first access request to the radio access network node in the first PLMN, the terminal selects, as a PLMN identifier corresponding to the first PLMN, a PLMN identifier from PLMN identifiers corresponding to DCN identifier lists that include a DCN identifier of the dedicated core network corresponding to the DCN indication information. Then, before sending the first access request to the first PLMN, the terminal sends, to the first PLMN, the PLMN identifier corresponding to the first PLMN.

In this embodiment of this application, the terminal may send the first access request to the first PLMN by sending the first access request to the radio access network node in the first PLMN.

The radio access network node in the first PLMN may determine a first core network node based on the PLMN identifier corresponding to the first PLMN and the DCN indication information in the first access request sent by the terminal. For example, in an LTE system, the first radio access network node may determine, based on the PLMN identifier corresponding to the first PLMN and the DCN indication information, an MME group identifier corresponding to the first core network node, and thereby find an access address of the first core network node based on the MME group identifier by using an NNSF (NAS node selection Function, non-access stratum node selection function), so as to determine the first core network node.

The terminal may send, to the radio access network node in the first PLMN by using RRC signaling, the PLMN identifier corresponding to the first PLMN. For example, the terminal may send, to the radio access network node in the first PLMN by using an RRC connection request (RRC Connection Request) message, the PLMN identifier corresponding to the first PLMN. After sending the RRC connection request message, the terminal may further receive an RRC connection setup (RRC Connection Setup) message returned by the radio access network node in the first PLMN.

In step 303, after the terminal sends the first access request to the first PLMN, the first PLMN sends the access reject message to the terminal if the first PLMN determines that the first core network node is performing congestion control on the dedicated core network corresponding to the DCN indication information. The access reject message is used to instruct the first core network node to reject access of the terminal to the dedicated core network corresponding to the DCN indication information.

In this embodiment of this application, the first PLMN may determine, in two manners, that the first core network node is performing congestion control on a dedicated core network that the terminal needs to access. The following provides detailed description.

In a possible implementation, after the radio access network node in the first PLMN sends, to the first core network node, the DCN indication information in the first access request sent by the terminal, if the radio access network node in the first PLMN receives a service reject message sent by the first core network node, the radio access network node in the first PLMN determines that the first core network node rejects access of the terminal to the dedicated core network corresponding to the DCN indication information. The service reject message is sent by the first core network node after the first core network node determines to reject access of the terminal to the dedicated core network corresponding to the DCN indication information.

After the radio access network node in the first PLMN receives the service reject message, the radio access network node in the first PLMN may send the access reject message to the terminal based on the received service reject message, and release a radio connection between the radio access network node and the terminal. The access reject message sent by the radio access network node in the first PLMN may be an RRC message.

Optionally, the service reject message sent by the first core network node may be information such as a non-access stratum reject message (NAS Reject Message). After receiving the non-access stratum reject message, the radio access network node in the first PLMN may use the non-access stratum reject message as the access reject message, and forward the non-access stratum reject message to the terminal.

In another possible implementation, if the radio access network node in the first PLMN determines that the DCN identifier indicated by the DCN indication information in the first access request is in a congestion control DCN identifier list, the radio access network node in the first PLMN determines that the first core network node rejects access of the terminal to the dedicated core network corresponding to the DCN indication information. The congestion control DCN identifier list is sent by the first core network node to the first radio access network node. The congestion control DCN identifier list is used to instruct the radio access network node in the first PLMN to reject access of the terminal to a dedicated core network corresponding to a DCN identifier in the congestion control DCN identifier list.

Further, the access reject message received by the terminal may include an access reject reason identifier. The access reject reason identifier is used to indicate a reason for rejecting access of the terminal to the DCN. For example, the access reject reason identifier may indicate that the reason for rejecting access of the terminal to the DCN is that the first core network node is performing congestion control on the dedicated core network corresponding to the DCN indication information, or the like.

In this embodiment of this application, the terminal determines the second PLMN based on the DCN indication information if the terminal determines, based on the access reject reason identifier, that the first core network node is performing congestion control on the DCN. Optionally, if the terminal determines, based on the access reject reason identifier, that the first core network node rejects, for another reason, access of the terminal to the dedicated core network corresponding to the DCN indication information, the terminal may back off and wait; and after a backoff time expires, re-attempt to access the dedicated core network corresponding to the DCN indication information.

In step 304, the first PLMN and the second PLMN are different PLMNs.

After receiving the access reject message, the terminal may first determine the second PLMN, and then send the second access request to the second PLMN.

In this embodiment of this application, a radio access network node in the second PLMN and the radio access network node in the first PLMN may be a same radio access network node. To be specific, the first PLMN and the second PLMN share one radio access network node, and a radio access network node corresponding to the first core network node is the same as a radio access network node corresponding to a second core network node. In this case, after receiving the access reject message, the terminal reselects the second PLMN, and sends the second access request to the radio access network node in the second PLMN (which is the radio access network node in the first PLMN in this scenario).

Specifically, after determining that the first core network node rejects access of the terminal to the dedicated core network corresponding to the DCN indication information, the terminal determines, from the N DCN identifier lists, all DCN identifier lists that include the DCN identifier indicated by the DCN indication information; and then selects a PLMN identifier from PLMN identifiers corresponding to all the DCN identifier lists that include the DCN identifier indicated by the DCN indication information, and determines the second PLMN based on the selected PLMN identifier.

It should be noted that, because the first PLMN is different from the second PLMN, the PLMN identifier selected by the terminal is different from a PLMN identifier selected last time.

Further, the access reject message received by the terminal includes a PLMN identifier list. The PLMN identifier list is used to instruct the terminal to select a PLMN identifier from the PLMN identifier list. In this case, the terminal selects, from the PLMN identifiers corresponding to all the DCN identifier lists that include the DCN identifier indicated by the DCN indication information, a PLMN identifier that is in both the N PLMN identifiers and the PLMN identifier list, and determines the second PLMN based on the selected PLMN identifier.

In this embodiment of this application, alternatively, the radio access network node in the second PLMN may be a radio access network node different from the radio access network node in the first PLMN. For example, after determining that the first core network node rejects access of the terminal to the dedicated core network corresponding to the DCN indication information, the terminal determines, based on the first DCN information sent by the radio access network node in the first PLMN, that no other DCN identifier list, than a DCN identifier list corresponding to the first PLMN selected for the first time, that includes the DCN identifier indicated by the DCN indication information exists in the first DCN information; and then selects, based on the DCN identifier indicated by the DCN indication information, the second PLMN by using DCN information sent by a radio access network node in another PLMN.

Specifically, if the terminal determines that a DCN identifier list that includes the DCN identifier indicated by the DCN indication information exists in M DCN identifier lists in received second DCN information, the terminal selects a PLMN identifier from PLMN identifiers corresponding to all DCN identifier lists that include the DCN identifier indicated by the DCN indication information, so as to determine the second PLMN based on the selected PLMN identifier. The second DCN information includes the M DCN identifier lists and M PLMN identifiers corresponding to the M DCN identifier lists, and M is a natural number.

Further, the access reject message received by the terminal includes a PLMN identifier list. In this case, when selecting a PLMN identifier, the terminal selects, from the PLMN identifiers corresponding to all the DCN identifier lists that include the DCN identifier indicated by the DCN indication information, a PLMN identifier that is in the PLMN identifier list.

It should be noted that, the PLMN identifier list included in the access reject message may be sent by the first core network node to the radio access network node in the first PLMN, and the radio access network node in the first PLMN forwards the PLMN identifier list to the terminal after receiving the PLMN identifier list. Optionally, the PLMN identifier list may be sent by the first core network node to the first radio access network node when the first core network node sends the congestion control DCN identifier list to the radio access network node in the first PLMN.

It should be noted that, before sending the second access request to the radio access network node in the second PLMN, the terminal may further send a second PLMN identifier to the radio access network node in the second PLMN, so that the radio access network node in the second PLMN determines the second core network node based on the second PLMN identifier and the DCN indication information.

In this embodiment of this application, the second access request sent by the terminal may further include a redirection permission identifier. The redirection permission identifier is used to indicate to the second PLMN whether the terminal has permission to access, in a cross-PLMN manner, the dedicated core network corresponding to the DCN indication information. Specifically, if the radio access network node or the second core network node in the second PLMN determines, based on the redirection permission identifier, that the terminal has the permission to access, in the cross-PLMN manner, the dedicated core network corresponding to the DCN indication information, the radio access network node or the second core network node in the second PLMN may connect the terminal and the dedicated core network corresponding to the DCN indication information. If the radio access network node or the second core network node in the second PLMN determines, based on the redirection permission identifier, that the terminal has no permission to access the DCN in the cross-PLMN manner, the radio access network node or the second core network node in the second PLMN may reject access of the terminal to the dedicated core network corresponding to the DCN indication information.

Optionally, after receiving the second access request and determining that the second access request includes the redirection permission identifier, the radio access network node in the second PLMN forwards the redirection permission identifier to the second core network node that is corresponding to the dedicated core network corresponding to the DCN indication information and that is in the second PLMN, so that the second core network node can determine, based on the redirection permission identifier, whether to connect the terminal and the dedicated core network corresponding to the DCN indication information. If the second core network node determines, based on the redirection permission identifier, that the terminal has no permission to access the DCN in the cross-PLMN manner, the second core network node may reject access of the terminal to the dedicated core network corresponding to the DCN indication information, and send a service reject message to the radio access network node in the second PLMN. If the second core network node determines, based on the redirection permission identifier, that the terminal has the permission to access the DCN in the cross-PLMN manner, the second core network node may connect the terminal and the dedicated core network corresponding to the DCN indication information.

It should be noted that the redirection permission identifier may be preconfigured for the terminal by a PLMN to which the terminal belongs. In addition, in the foregoing procedure, the radio access network node in the first PLMN and the radio access network node in the second PLMN may be shared by a plurality of PLMNs, or may be exclusive to one PLMN.

According to the method described above, after access of the terminal to the dedicated core network that is corresponding to the DCN indication information and that the terminal needs to access is rejected by the first PLMN, the terminal re-determines the second PLMN different from the first PLMN, so as to connect, by using the second PLMN, the terminal and the dedicated core network corresponding to the DCN indication information, so that the terminal can quickly access the dedicated core network. In this way, system resource utilization and user experience are improved.

The following describes the foregoing procedure by using specific embodiments.

In the following embodiments, description is provided by using an example in which a radio access network node in a first PLMN and a radio access network node in a second PLMN are a same radio access network node. For a case in which the radio access network node in the first PLMN and the radio access network node in the second PLMN are different radio access network nodes, refer to the foregoing description. Details are not described herein.

Figure 4:
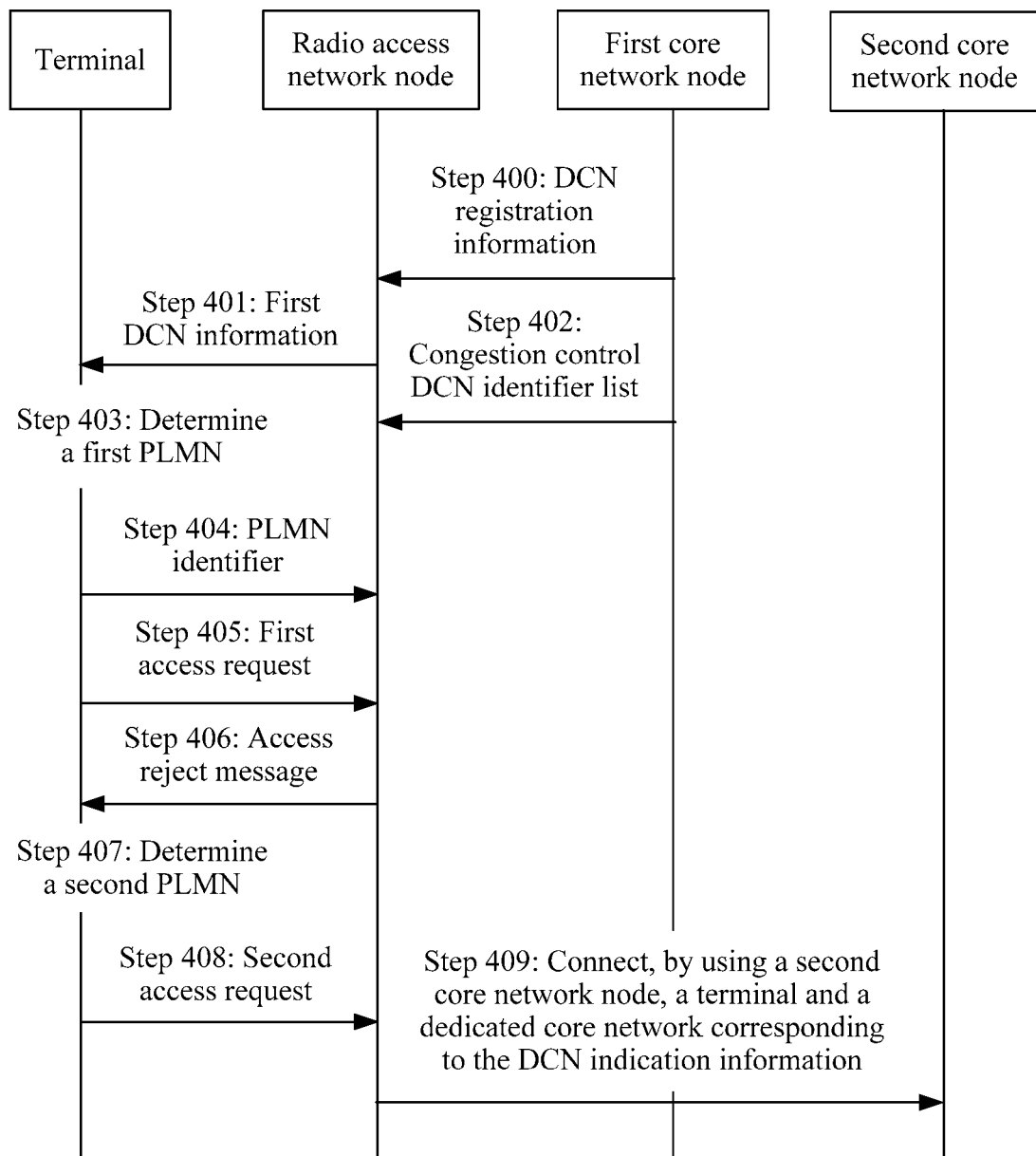
FIG. 4 is a flowchart of an access method according to an embodiment of this application.

As shown in FIG. 4, FIG. 4 is a flowchart of an access method according to an embodiment of this application.

Optionally, step 400: A first core network node sends DCN registration information to a radio access network node in a first PLMN.

The DCN registration information includes information such as a PLMN identifier of the first core network node and a DCN identifier list of the first core network node.

It should be noted that, step 400 does not need to be performed each time, and needs to be performed only once, or is performed when the first core network node needs to update the DCN registration information.

Step 401: The radio access network node in the first PLMN generates first DCN information based on the received DCN registration information, and sends the first DCN information to a terminal.

The first DCN information includes N DCN identifier lists and N PLMN identifiers that have a correspondence.

For example, in an LTE system, the radio access network node in the first PLMN may broadcast the first DCN information by using SIB information. Certainly, alternatively, the first DCN information may be sent in another manner. Details are not described herein.

Optionally, step 402: The first core network node sends information such as a congestion control DCN identifier list to the radio access network node in the first PLMN.

The congestion control DCN identifier list is used to instruct the radio access network node in the first PLMN to reject access of the terminal to a DCN corresponding to a DCN identifier in the congestion control DCN identifier list.

It should be noted that, step 402 does not need to be performed each time, and needs to be performed only once, or is performed when the first core network node needs to update the congestion control DCN identifier list.

Step 403: The terminal selects a PLMN identifier from N PLMN identifiers based on DCN indication information, and determines the first PLMN based on the selected PLMN identifier.

Step 404: The terminal sends the selected PLMN identifier to the radio access network node in the first PLMN.

For example, the terminal may send a first PLMN identifier to the radio access network node in the first PLMN by using an RRC connection request message. In addition, the terminal may receive an RRC connection setup message returned by the radio access network node in the first PLMN.

Step 405: The terminal sends a first access request to the radio access network node in the first PLMN.

The first access request includes information such as the DCN indication information.

Step 406: After determining that the congestion control DCN identifier list includes a DCN identifier indicated by the DCN indication information, the radio access network node in the first PLMN sends an access reject message to the terminal.

In this case, the radio access network node in the first PLMN determines that the first core network node is performing congestion control on a DCN corresponding to the DCN identifier indicated by the DCN indication information, and therefore rejects access of the terminal to the DCN.

Step 407: The terminal determines a second PLMN based on the DCN indication information.

Optionally, if the terminal determines that the access reject message includes a PLMN identifier list, a PLMN identifier of the determined second PLMN is in the PLMN identifier list.

Step 408: The terminal sends, to the radio access network node in the second PLMN, a second access request that includes the DCN indication information.

Step 409: The radio access network node in the second PLMN connects, by using a second core network node, the terminal and a dedicated core network corresponding to the DCN indication information.

Figure 5:
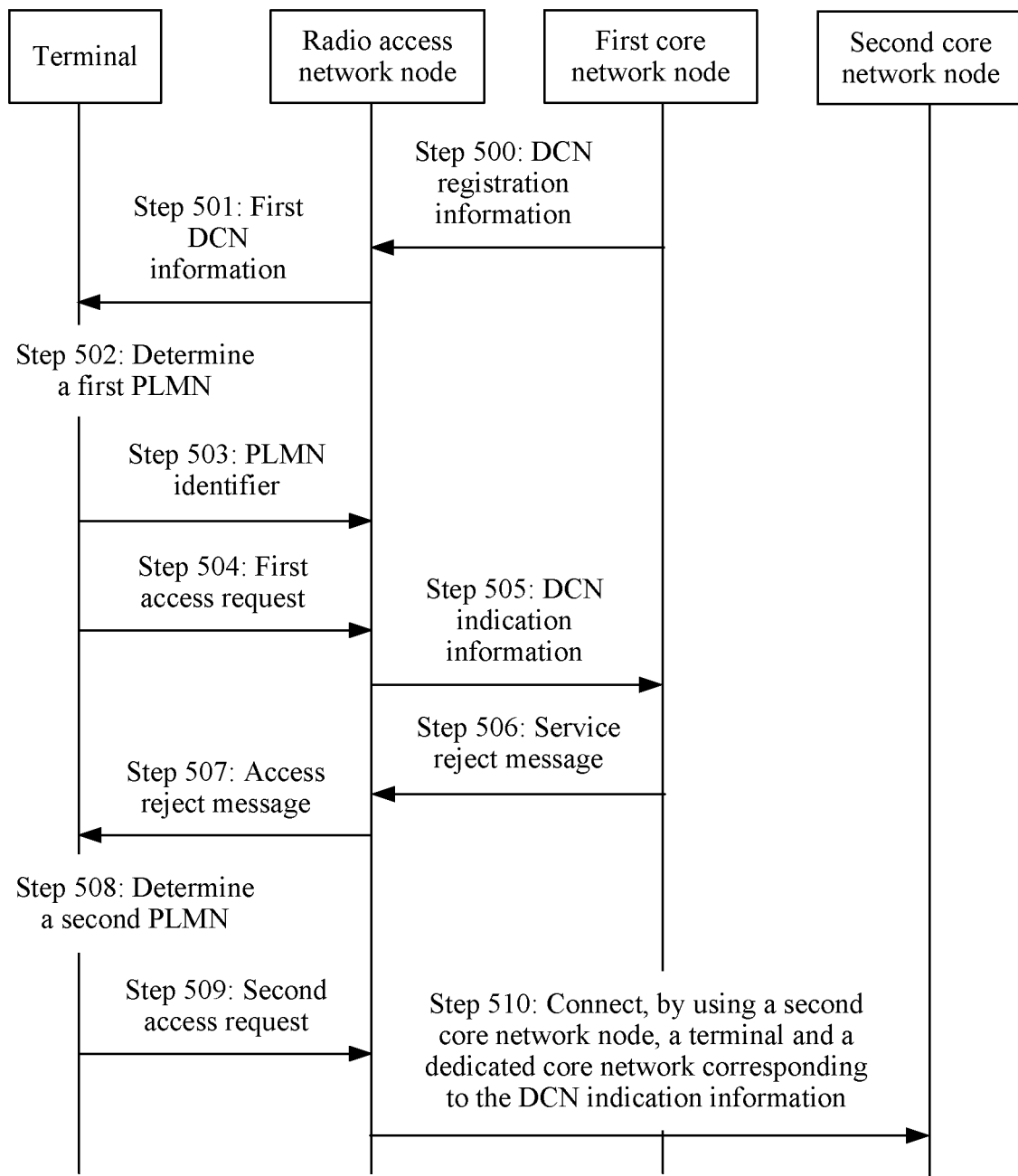
FIG. 5 is a flowchart of an access method according to an embodiment of this application.

As shown in FIG. 5, FIG. 5 is a flowchart of an access method according to an embodiment of this application.

Optionally, step 500: A first core network node sends DCN registration information to a radio access network node in a first PLMN.

The DCN registration information includes information such as a PLMN identifier of the first core network node and a DCN identifier list of the first core network node.

It should be noted that, step 500 does not need to be performed each time, and needs to be performed only once, or is performed when the first core network node needs to update the DCN registration information.

Step 501: The radio access network node in the first PLMN generates first DCN information based on the received DCN registration information, and sends the first DCN information to a terminal.

For example, in an LTE system, the radio access network node in the first PLMN may broadcast the first DCN information by using SIB information. Certainly, alternatively, the first DCN information may be sent in another manner. Details are not described herein.

The first DCN information includes N DCN identifier lists and N PLMN identifiers that have a correspondence.

Step 502: The terminal selects a PLMN identifier from N PLMN identifiers based on DCN indication information, and determines the first PLMN based on the selected PLMN identifier.

Step 503: The terminal sends the selected PLMN identifier to the radio access network node in the first PLMN.

For example, the terminal may send a first PLMN identifier to the radio access network node in the first PLMN by using an RRC connection request message. In addition, the terminal may receive an RRC connection setup message returned by the radio access network node in the first PLMN.

Step 504: The terminal sends a first access request to the radio access network node in the first PLMN.

The first access request includes information such as the DCN indication information.

Step 505: The radio access network node in the first PLMN forwards the DCN indication information to the first core network node.

Step 506: After determining that congestion control is being performed on a dedicated core network corresponding to the DCN indication information, the first core network node sends a service reject message to the radio access network node in the first PLMN.

Optionally, the service reject message may include a PLMN identifier list, and the terminal may determine a second PLMN based on the PLMN identifier list.

Step 507: After receiving the service reject message, the radio access network node in the first PLMN sends an access reject message to the terminal.

Optionally, the radio access network node in the first PLMN may further forward, to the terminal, the PLMN identifier list sent by the first core network node.

Step 508: The terminal determines a second PLMN based on the DCN indication information.

Optionally, if the terminal determines that the access reject message includes the PLMN identifier list, a PLMN identifier of the determined second PLMN is in the PLMN identifier list.

Step 509: The terminal sends, to the radio access network node in the second PLMN, a second access request that includes the DCN indication information.

Optionally, the second access request sent by the terminal may include a redirection permission identifier.

Step 510: The radio access network node in the second PLMN connects, by using a second core network node, the terminal and a dedicated core network corresponding to the DCN indication information.

Optionally, before connecting the terminal and the dedicated core network corresponding to the DCN indication information, the second core network node needs to determine, based on the redirection permission identifier, that the terminal has permission to access the DCN in a cross-PLMN manner.

In an embodiment of this application, alternatively, after determining that access of a terminal to a dedicated core network is rejected by a core network node in a first PLMN, a radio access network node may reselect a second PLMN for the terminal. The following provides detailed description.

Figure 6:
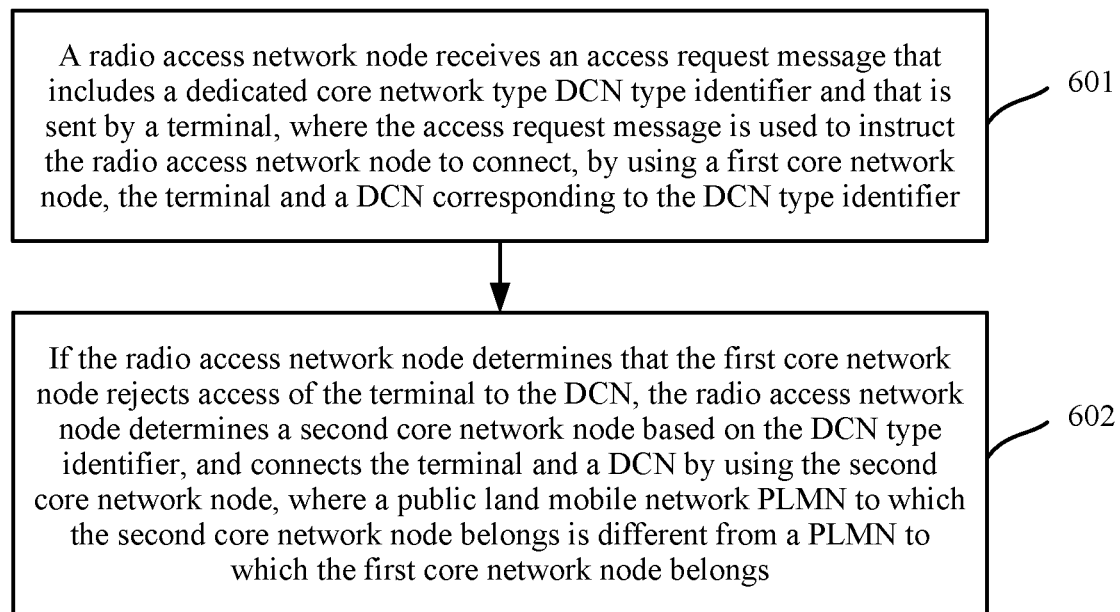
FIG. 6 is a schematic flowchart of an access method according to an embodiment of this application.

As shown in FIG. 6, an embodiment of this application provides a schematic flowchart of an access method. The method includes the following steps:

Step 601: A radio access network node receives an access request sent by a terminal, where the access request includes dedicated core network DCN indication information, and the access request is used to instruct the radio access network node to connect the terminal and a dedicated core network that is corresponding to the DCN indication information and that is in a first public land mobile network PLMN.

Step 602: If the radio access network node determines that a first core network node that is corresponding to the dedicated core network and that is in the first PLMN rejects access of the terminal to the dedicated core network corresponding to the DCN indication information, the radio access network node determines a second PLMN based on the DCN indication information, and connects the terminal and a dedicated core network that is corresponding to the DCN indication information and that is in the second PLMN.

It should be noted that, in the foregoing procedure, the radio access network node is a radio access network node shared by a plurality of PLMNs.

Step 601: The DCN indication information is used to indicate a DCN identifier of a dedicated core network that the terminal needs to access. The DCN indication information may be implemented in a plurality of forms. For example, the DCN indication information may be a dedicated core network identifier, or the DCN indication information may be a dedicated core network type, or the DCN indication information may be a dedicated core network type identifier. Certainly, alternatively, the DCN indication information may be implemented in another form. Details are not described herein.

Before the radio access network node receives the access request sent by the terminal, the radio access network node may receive DCN registration information sent by N core network nodes, and N is a natural number. DCN registration information sent by each core network node includes a PLMN identifier and a DCN identifier list of the core network node. The PLMN identifier is used to indicate a PLMN to which the core network node belongs, and the DCN identifier list is used to indicate all dedicated core networks supported by the core network node.

Optionally, the radio access network node may further receive a congestion control DCN identifier list sent by the first core network node. The congestion control DCN identifier list is used to instruct the radio access network node to reject access of the terminal to a dedicated core network corresponding to a DCN identifier in the congestion control DCN identifier list.

Optionally, the radio access network node may further receive a PLMN identifier list sent by the first core network node. The PLMN identifier list is used to instruct the radio access network node to determine the second PLMN based on the PLMN identifier list.

Before the radio access network node receives the access request sent by the terminal, the radio access network node sends DCN information to the terminal. The DCN information includes N DCN identifier lists and N PLMN identifiers corresponding to the N DCN identifier lists.

In this embodiment of this application, the radio access network node may send the DCN information to the terminal by using a broadcast SIB message, or the radio access network node may send the DCN information to the terminal by using RRC signaling.

After the terminal receives the DCN information, if the terminal determines that a DCN identifier list that includes a DCN identifier indicated by the DCN indication information exists in the DCN information, the terminal determines to send the access request to the radio access network node.

Further, if the terminal determines that a PLMN identifier corresponding to a PLMN to which the terminal belongs exists in the DCN information and that a DCN identifier list corresponding to the PLMN identifier corresponding to the PLMN to which the terminal belongs includes the DCN identifier, the terminal determines to send the access request to the radio access network node.

Before sending the access request to the radio access network node, the terminal may further send the PLMN identifier to the radio access network node, so that the radio access network node determines the first core network node based on the PLMN identifier and the DCN indication information subsequently sent by the terminal.

It should be noted that the PLMN identifier sent by the terminal may be the PLMN identifier corresponding to the PLMN to which the terminal belongs, or may be a PLMN identifier corresponding to another PLMN, provided that it is ensured that a DCN identifier list corresponding to the PLMN identifier sent by the terminal includes the DCN identifier.

Further, in this embodiment of this application, the access request sent by the terminal further includes a redirection permission identifier. The redirection permission identifier is used to indicate whether the terminal has permission to access the DCN in a cross-PLMN manner.

Step 602: the first PLMN and the second PLMN are different PLMNs.

In this embodiment of this application, the radio access network node may determine, in two manners, that the first core network node is performing congestion control on the dedicated core network corresponding to the DCN indication information. The following provides detailed description.

In a possible implementation, the radio access network node sends the DCN indication information in the access request to the first core network node. If the first core network node determines that congestion control is being performed on the dedicated core network corresponding to the DCN indication information, the first core network node rejects access of the terminal to the dedicated core network corresponding to the DCN indication information, and sends a service reject message to the radio access network node. After receiving the service reject message sent by the first core network node, the radio access network node may determine that the first core network node rejects access of the terminal to the dedicated core network corresponding to the DCN indication information, send an access reject message to the terminal based on the received service reject message, and then release a radio connection between the radio access network node and the terminal.

Optionally, the service reject message sent by the first core network node may be information such as a non-access stratum reject message. After receiving the non-access stratum reject message, the radio access network node may use the non-access stratum reject message as the access reject message, and forward the non-access stratum reject message to the terminal.

In another possible implementation, if the radio access network node determines that the DCN identifier indicated by the DCN indication information in the access request is in the congestion control DCN identifier list, the radio access network node determines that the first core network node rejects access of the terminal to the dedicated core network corresponding to the DCN indication information. The congestion control DCN identifier list may be sent by the first core network node to the radio access network node. The congestion control DCN identifier list is used to instruct the radio access network node to reject access of the terminal to the dedicated core network corresponding to the DCN identifier in the congestion control DCN identifier list.

After determining that the first core network node rejects access of the terminal to the DCN, the radio access network node may determine, from the N DCN identifier lists, all DCN identifier lists that include the DCN identifier, then select a PLMN identifier from PLMN identifiers corresponding to all the DCN identifier lists that include the DCN identifier, and determine the second PLMN based on the selected PLMN identifier.

It should be noted that, because the first PLMN is different from the second PLMN, the PLMN identifier selected by the radio access network node is different from a PLMN identifier selected last time.

Optionally, if the radio access network node determines that the PLMN identifier list sent by the first core network node is received, when selecting a PLMN identifier, the radio access network node selects, from the PLMN identifiers corresponding to all the DCN identifier lists that include the DCN identifier indicated by the DCN indication information, a PLMN identifier that is in the PLMN identifier list. Then, the radio access network node may determine the second PLMN based on the selected PLMN identifier.

Optionally, if the radio access network node determines that the access request further includes the redirection permission identifier, before determining the second PLMN, the radio access network node determines, based on the redirection permission identifier, whether the terminal has the permission to access the DCN in the cross-PLMN manner; and determines the second PLMN based on the DCN indication information if the radio access network node determines that the terminal has the permission to access, in the cross-PLMN manner, the dedicated core network corresponding to the DCN indication information; or if the radio access network node determines that the terminal has no permission to access, in the cross-PLMN manner, the dedicated core network corresponding to the DCN indication information, rejects the access request sent by the terminal.

Optionally, the radio access network node may further forward, to a second core network node that is corresponding to the dedicated core network corresponding to the DCN indication information and that is in the second PLMN, the redirection permission identifier included in the access request, so that the second core network node can determine, based on the redirection permission identifier, whether to connect the terminal and the dedicated core network corresponding to the DCN indication information. If the second core network node determines, based on the redirection permission identifier, that the terminal has no permission to access the DCN in the cross-PLMN manner, the second core network node may reject access of the terminal to the dedicated core network corresponding to the DCN indication information, and send a service reject message to the second radio access network node.

It should be noted that the redirection permission identifier is preconfigured for the terminal. Specific configuration is not limited in this embodiment of this application.

According to the method described above, after the radio access network node determines that access of the terminal to the dedicated core network that the terminal needs to access is rejected by the first core network node, the radio access network node re-determines the second PLMN different from the first PLMN, so as to connect the terminal and the dedicated core network by using the second core network node in the second PLMN, so that the terminal can quickly access the dedicated core network. In this way, system resource utilization and user experience are improved.

The following describes the foregoing procedure by using specific embodiments.

Figure 7:
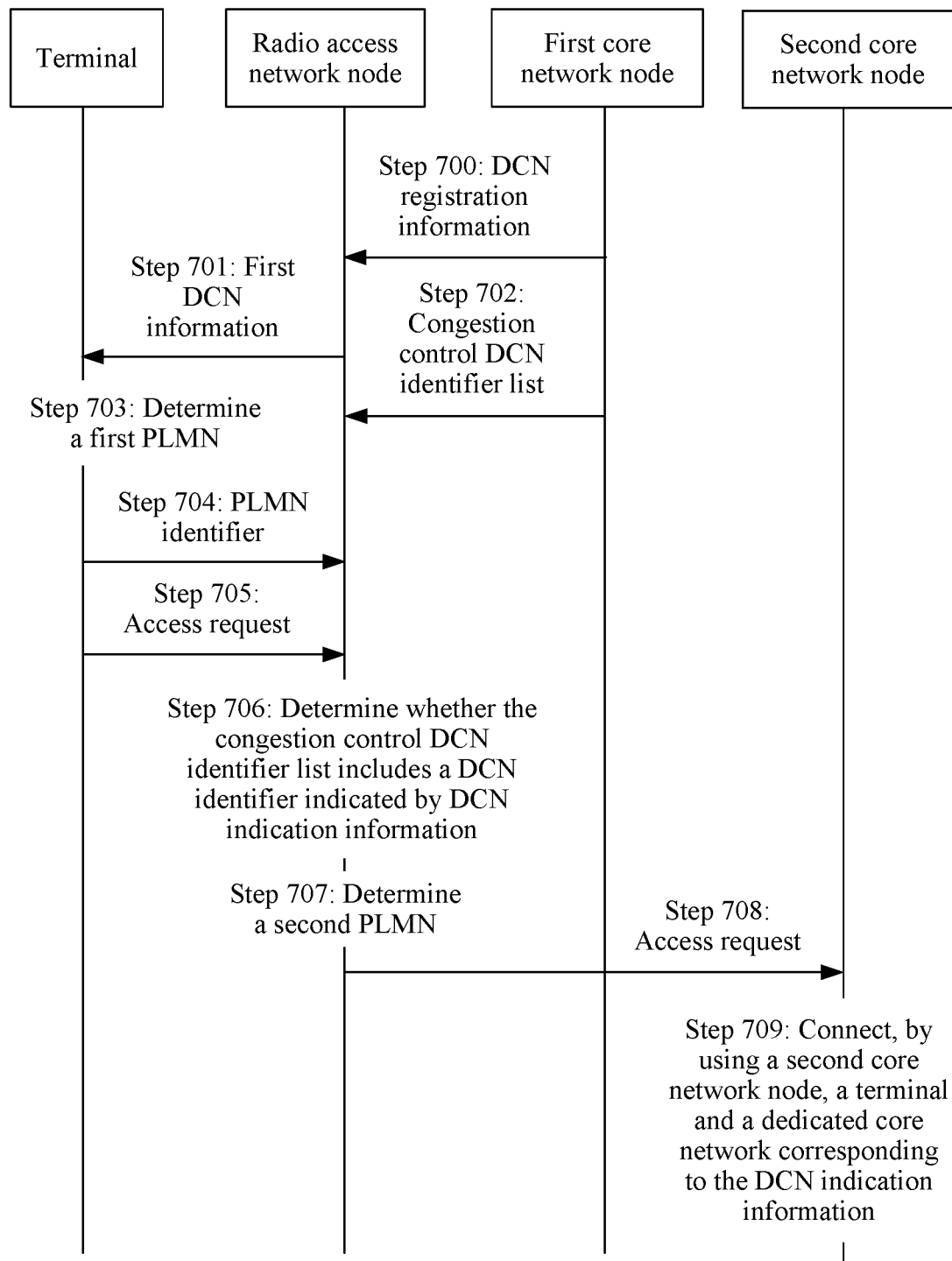
FIG. 7 is a flowchart of an access method according to an embodiment of this application.

As shown in FIG. 7, FIG. 7 is a flowchart of an access method according to an embodiment of this application.

Optionally, Step 700: A first core network node sends DCN registration information to a radio access network node.

The DCN registration information includes information such as a PLMN identifier of the first core network node and a DCN identifier list of the first core network node.

It should be noted that, step 700 does not need to be performed each time, and needs to be performed only once, or is performed when the first core network node needs to update the DCN registration information.

Step 701: The radio access network node generates first DCN information based on the received DCN registration information, and sends the first DCN information to a terminal.

For example, in an LTE system, the radio access network node may broadcast the first DCN information by using SIB information. Certainly, alternatively, the DCN information may be sent in another manner. Details are not described herein.

The first DCN information includes N DCN identifier lists and N PLMN identifiers that have a correspondence.

Optionally, step 702: The first core network node sends information such as a congestion control DCN identifier list to the radio access network node.

Optionally, the first core network node may further send a PLMN identifier list to the radio access network node in step 702.

It should be noted that, step 702 does not need to be performed each time, and needs to be performed only once, or is performed when the first core network node needs to update the congestion control DCN identifier list or the PLMN identifier list.

Step 703: The terminal selects a PLMN identifier from N PLMN identifiers based on DCN indication information, and determines a first PLMN based on the selected PLMN identifier.

The terminal may use, as the selected PLMN identifier, a PLMN identifier corresponding to a PLMN to which the terminal belongs. Alternatively, the terminal may select a PLMN identifier corresponding to a DCN identifier list that includes a DCN identifier. The DCN identifier is an identifier corresponding to a DCN that the terminal needs to access.

Step 704: The terminal sends the selected PLMN identifier to the radio access network node.

For example, the terminal may send the PLMN identifier to the radio access network node by using an RRC connection request message. In addition, the terminal may receive an RRC connection setup message returned by the radio access network node.

Step 705: The terminal sends an access request to the radio access network node.

The access request may include information such as the DCN indication information.

Step 706: The radio access network node determines whether the congestion control DCN identifier list includes a DCN identifier indicated by the DCN indication information.

Step 707: After determining that the congestion control DCN identifier list includes the DCN identifier indicated by the DCN indication information, the radio access network node determines a second PLMN based on the DCN indication information.

If the radio access network node determines that the PLMN identifier list is received, the radio access network node selects, from the N PLMN identifiers, a PLMN identifier that is in the PLMN identifier list, and a DCN identifier list corresponding to the selected PLMN identifier includes the DCN identifier indicated by the DCN indication information. The radio access network node may determine the second PLMN based on the selected PLMN identifier.

Step 708: The radio access network node sends, to a second core network node corresponding to the second PLMN, the access request that includes the DCN indication information.

Step 709: The second core network node connects the terminal and a dedicated core network corresponding to the DCN indication information.

Figure 8:
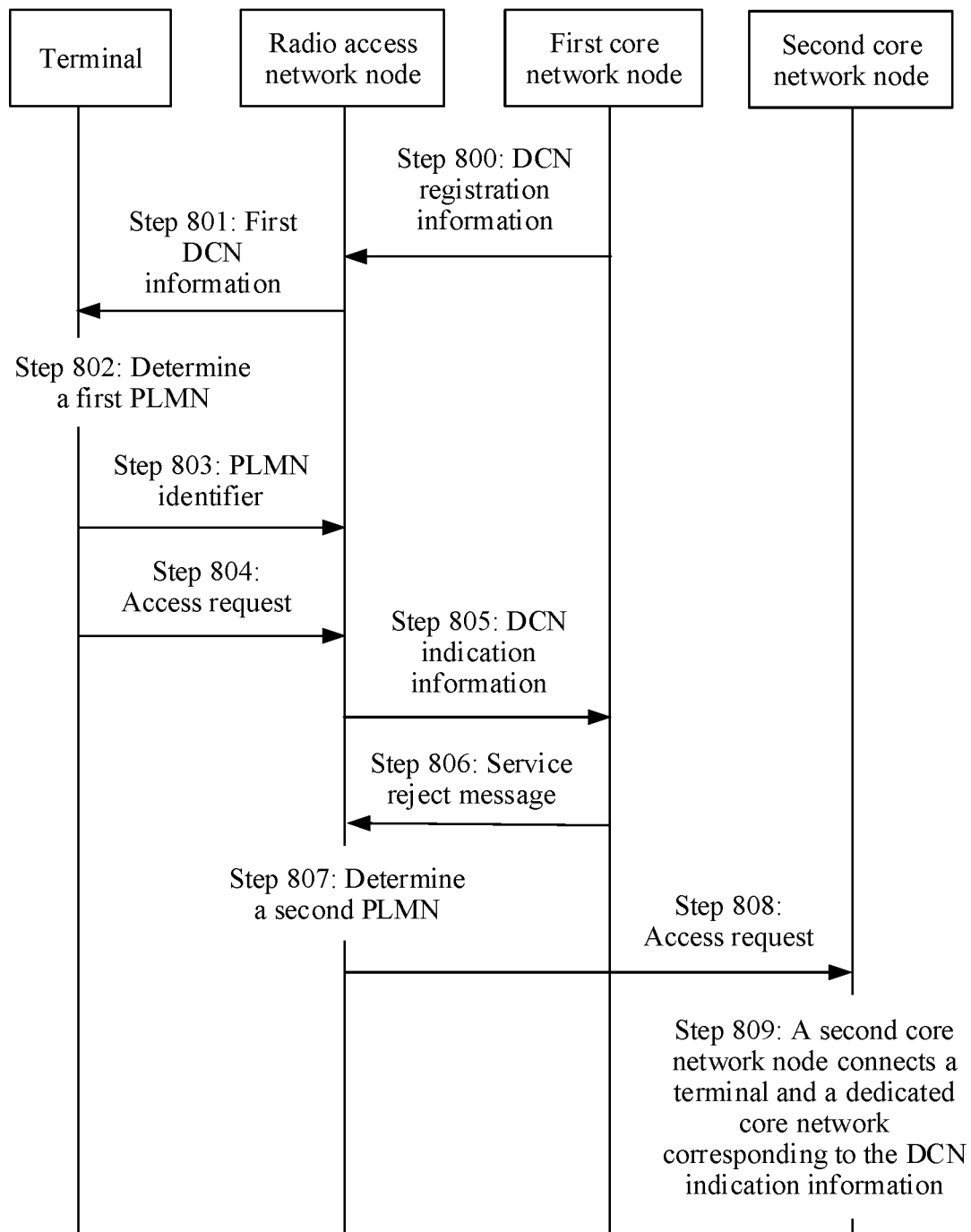
FIG. 8 is a flowchart of an access method according to an embodiment of this application.

As shown in FIG. 8, FIG. 8 is a flowchart of an access method according to an embodiment of this application.

Optionally, step 800: A first core network node sends DCN registration information to a radio access network node.

The DCN registration information includes information such as a PLMN identifier of the first core network node and a DCN identifier list of the first core network node.

It should be noted that, step 800 does not need to be performed each time, and needs to be performed only once, or is performed when the first core network node needs to update the DCN registration information.

Step 801: The radio access network node generates first DCN information based on the received DCN registration information, and sends the first DCN information to a terminal.

For example, in an LTE system, the radio access network node may broadcast the first DCN information by using SIB information. Certainly, alternatively, the first DCN information may be sent in another manner. Details are not described herein.

The DCN information includes N DCN identifier lists and N PLMN identifiers that have a correspondence.

Step 802: The terminal selects a PLMN identifier from N PLMN identifiers based on the first DCN indication information, and determines a first PLMN based on the selected PLMN identifier.

Step 803: The terminal sends the selected PLMN identifier to the radio access network node corresponding to the first PLMN.

For example, the terminal may send a first PLMN identifier to the radio access network node by using an RRC connection request message. In addition, the terminal may receive an RRC connection setup message returned by the radio access network node.

Step 804: The terminal sends an access request to the radio access network node.

The access request includes information such as the DCN indication information.

Optionally, the access request sent by the terminal may include a redirection permission identifier.

Step 805: The radio access network node forwards the DCN indication information in the access request to the first core network node.

Step 806: After determining that congestion control is being performed on a dedicated core network corresponding to the DCN indication information, the first core network node sends a service reject message to the radio access network node.

Optionally, the service reject message may include a PLMN identifier list, so that the radio access network node determines a second PLMN based on the PLMN identifier list.

Step 807: After receiving the service reject message, the radio access network node determines a second PLMN based on the DCN indication information.

Optionally, if the radio access network node determines that the service reject message includes the PLMN identifier list, a PLMN identifier of the determined second PLMN is in the PLMN identifier list.

Step 808: The radio access network node forwards, to a second core network node corresponding to the second PLMN, the access request sent by the terminal.

Step 809: The second core network node connects the terminal and a dedicated core network corresponding to the DCN indication information.

Optionally, before connecting the terminal and the dedicated core network corresponding to the DCN indication information, the second core network node needs to determine, based on the redirection permission identifier, that the terminal has permission to access the DCN in a cross-PLMN manner.

Based on a same concept, an embodiment of this application provides a terminal, configured to perform the foregoing method procedure.

Figure 9:
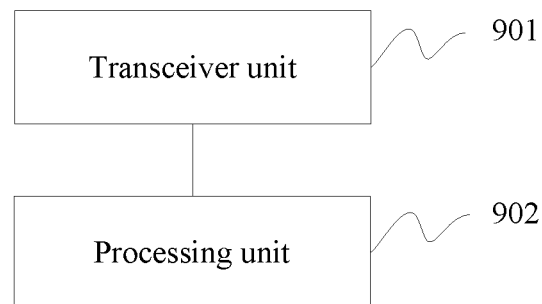
FIG. 9 is a schematic structural diagram of a terminal according to an embodiment of this application.

As shown in FIG. 9, FIG. 9 is a schematic structural diagram of a terminal according to an embodiment of this application.

Referring to FIG. 9, the terminal includes:

a transceiver unit 901, configured to obtain first dedicated core network DCN information; and a processing unit 902, configured to: determine a first public land mobile network PLMN based on the first DCN information and dedicated core network DCN indication information, and send a first access request to the first PLMN by using the transceiver unit, where the first access request includes the DCN indication information, and the first access request is used to request to access a dedicated core network that is corresponding to the DCN indication information and that is in the first PLMN.

The transceiver unit 901 is configured to receive an access reject message sent by the first PLMN. The access reject message is used to reject access of the terminal to the dedicated core network that is corresponding to the DCN indication information and that is in the first PLMN.

The processing unit 902 is configured to: determine a second PLMN based on the DCN indication information, and send a second access request to the second PLMN by using the transceiver unit 901. The second access request includes the DCN indication information, and the second access request is used to request to access a dedicated core network that is corresponding to the DCN indication information and that is in the second PLMN.

Optionally, the transceiver unit 901 is specifically configured to:

receive the first DCN information sent by a radio access network node in the first PLMN, where the first DCN information includes N DCN identifier lists and N PLMN identifiers that have a correspondence, any PLMN identifier is used to indicate a PLMN to which a DCN identifier list corresponding to the PLMN identifier belongs, and N is a natural number.

Optionally, the processing unit 902 is specifically configured to:

determine, from the N DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver unit 901 is further configured to:

receive second DCN information sent by a radio access network node in the second PLMN, where the second DCN information includes M DCN identifier lists and M PLMN identifiers corresponding to the M DCN identifier lists, and M is a natural number.

The processing unit 902 is specifically configured to:

determine, from the M DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, the access reject message includes a PLMN identifier list, and the PLMN identifier list is used to instruct the terminal to select a PLMN identifier from the PLMN identifier list.

The processing unit 902 is specifically configured to:

select, from the PLMN identifiers corresponding to all the DCN identifier lists that include the DCN identifier indicated by the DCN indication information, a PLMN identifier that is in the PLMN identifier list.

Optionally, the access reject message includes an access reject reason identifier, and the access reject reason identifier is used to indicate a reason for rejecting access of the terminal to the dedicated core network.

Before determining the second PLMN based on the DCN indication information, the processing unit 902 is further configured to:

determine, based on the access reject reason identifier, that the first PLMN is performing congestion control on the dedicated core network corresponding to the DCN indication information.

Optionally, the second access request further includes a redirection permission identifier.

The redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

Optionally, the DCN indication information is a dedicated core network identifier; or the DCN indication information is a dedicated core network type; or the DCN indication information is a dedicated core network type identifier.

Based on a same concept, an embodiment of this application provides a radio access network node, configured to perform the foregoing method procedure.

Figure 10:
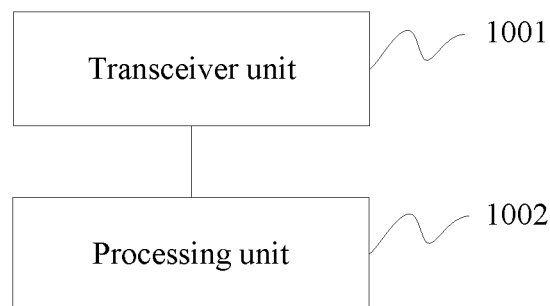
FIG. 10 is a schematic structural diagram of a radio access network node according to an embodiment of this application.

As shown in FIG. 10, FIG. 10 is a schematic structural diagram of a radio access network node according to an embodiment of this application.

A transceiver unit 1001 is configured to receive an access request sent by a terminal, where the access request includes dedicated core network DCN indication information, and the access request is used to instruct the radio access network node to connect the terminal and a dedicated core network that is corresponding to the DCN indication information and that is in a first public land mobile network PLMN.

A processing unit 1002 is configured to: if a first core network node that is corresponding to the dedicated core network and that is in the first PLMN rejects access of the terminal to the dedicated core network corresponding to the DCN indication information, determine a second PLMN based on the DCN indication information, and connect the terminal and a dedicated core network that is corresponding to the DCN indication information and that is in the second PLMN.

Optionally, the processing unit 1002 is specifically configured to:

send the DCN indication information to the first core network node by using the transceiver unit; and if a service reject message sent by the first core network node is received, determine that the first core network node rejects access of the terminal to the dedicated core network, where the service reject message is sent by the first core network node after the first core network node determines that congestion control is being performed on the dedicated core network corresponding to the DCN indication information.

Optionally, before receiving the access request sent by the terminal, the transceiver unit 1001 is further configured to:

receive a congestion control message that includes a congestion control DCN identifier list and that is sent by the first core network node, where the congestion control DCN identifier list is used to instruct the radio access network node to reject access of the terminal to a dedicated core network corresponding to a DCN identifier in the congestion control DCN identifier list.

The processing unit 1002 is further configured to:

if a DCN identifier of the dedicated core network corresponding to the DCN indication information is in the congestion control DCN identifier list, determine that the first core network node rejects access of the terminal to the dedicated core network corresponding to the DCN indication information.

Optionally, the processing unit 1002 is specifically configured to:

determine, from N DCN identifier lists, all DCN identifier lists that include a DCN identifier indicated by the DCN indication information, where the N DCN identifier lists are obtained by the radio access network node based on N pieces of received DCN registration information sent by N core network nodes, each piece of DCN registration information includes a PLMN identifier of a core network node that sends the DCN registration information and a DCN identifier list of the core network node, and N is a natural number; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver unit 1001 is further configured to:

receive a PLMN identifier list sent by the first core network node, where the PLMN identifier list is used to instruct the radio access network node to select a PLMN identifier from the PLMN identifier list.

The processing unit 1002 is further configured to:

select, from the PLMN identifiers corresponding to all the DCN identifier lists that include the DCN identifier indicated by the DCN indication information, a PLMN identifier that is in the PLMN identifier list.

Optionally, the access request further includes a redirection permission identifier, and the redirection permission identifier is used to indicate whether the terminal has permission to access, in a cross-PLMN manner, the dedicated core network corresponding to the DCN indication information.

Optionally, before determining the second PLMN based on the DCN indication information, the processing unit 1002 is further configured to:

determine, based on the redirection permission identifier, that the terminal has the permission to access the DCN in the cross-PLMN manner.

Optionally, after the second PLMN is determined based on the DCN indication information, the transceiver unit 1001 is further configured to:

forward the redirection permission identifier to a second core network node that is corresponding to the dedicated core network corresponding to the DCN indication information and that is in the second PLMN, so that after determining, based on the redirection permission identifier, that the terminal has the permission to access, in the cross-PLMN manner, the dedicated core network corresponding to the DCN indication information, the second core network node connects the terminal and the dedicated core network.

Optionally, the DCN indication information is a dedicated core network identifier; or the DCN indication information is a dedicated core network type; or the DCN indication information is a dedicated core network type identifier.

Based on a same concept, an embodiment of this application provides a terminal, configured to perform the foregoing method procedure.

Figure 11:
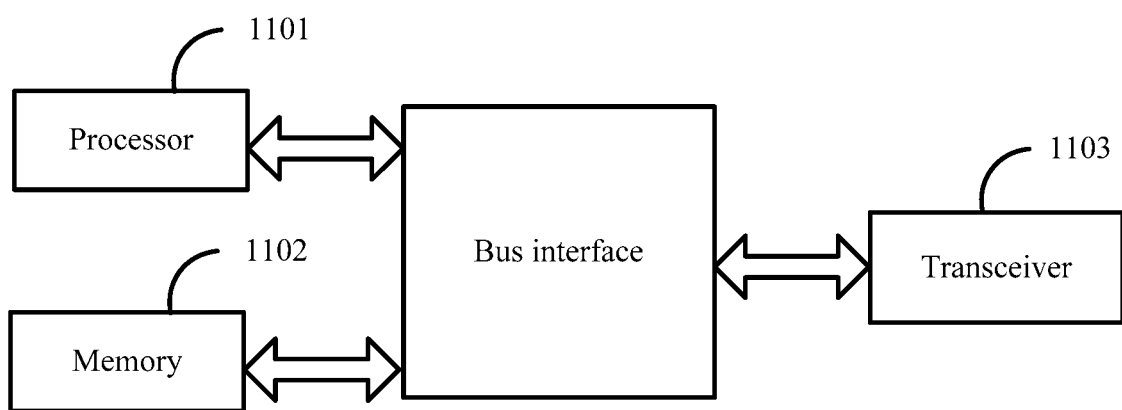
FIG. 11 is a schematic structural diagram of a terminal according to an embodiment of this application.

As shown in FIG. 11, FIG. 11 is a schematic structural diagram of a terminal according to an embodiment of this application.

Referring to FIG. 11, the terminal includes a processor 1101, a memory 1102, and a transmitter 1103.

The transceiver 1103 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof. The processor 1101 may be a central processing unit (English: central processing unit, CPU for short), a network processor (English: network processor, NP for short), or a combination of a CPU and an NP. The processor 1101 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field-programmable gate array (English: field-programmable gate array, FPGA for short), generic array logic (English: generic array logic, GAL for short), or any combination thereof. The memory 1102 may include a volatile memory (English: volatile memory), such as a random-access memory (English: random-access memory, RAM for short). Alternatively, the memory 1102 may include a non-volatile memory (English: non-volatile memory), such as a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory 1102 may include a combination of memories of the foregoing types.

The transceiver 1103 is configured to obtain first dedicated core network DCN information.

The processor 1101 is configured to: determine a first public land mobile network PLMN based on the first DCN information and dedicated core network DCN indication information, and send a first access request to the first PLMN by using the transceiver. The first access request includes the DCN indication information, and the first access request is used to request to access a dedicated core network that is corresponding to the DCN indication information and that is in the first PLMN.

The transceiver 1103 is configured to receive an access reject message sent by the first PLMN. The access reject message is used to reject access of the terminal to the dedicated core network that is corresponding to the DCN indication information and that is in the first PLMN.

The processor 1101 is configured to: determine a second PLMN based on the DCN indication information, and send a second access request to the second PLMN by using the transceiver 1103. The second access request includes the DCN indication information, and the second access request is used to request to access a dedicated core network that is corresponding to the DCN indication information and that is in the second PLMN.

Optionally, the transceiver 1103 is specifically configured to:

receive the first DCN information sent by a radio access network node in the first PLMN, where the first DCN information includes N DCN identifier lists and N PLMN identifiers that have a correspondence, any PLMN identifier is used to indicate a PLMN to which a DCN identifier list corresponding to the PLMN identifier belongs, and N is a natural number.

Optionally, the processor 1101 is specifically configured to:

determine, from the N DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver 1103 is further configured to:

receive second DCN information sent by a radio access network node in the second PLMN, where the second DCN information includes M DCN identifier lists and M PLMN identifiers corresponding to the M DCN identifier lists, and M is a natural number.

The processor 1101 is specifically configured to:

determine, from the M DCN identifier lists, all DCN identifier lists that include a DCN identifier indicated by the DCN indication information; and select a PLMN identifier from PLMN identifiers corresponding to all the DCN identifier lists that include the DCN identifier indicated by the DCN indication information, and determine the second PLMN based on the selected PLMN identifier.

Optionally, the access reject message includes a PLMN identifier list, and the PLMN identifier list is used to instruct the terminal to select a PLMN identifier from the PLMN identifier list.

The processor 1101 is specifically configured to:

select, from the PLMN identifiers corresponding to all the DCN identifier lists that include the DCN identifier indicated by the DCN indication information, a PLMN identifier that is in the PLMN identifier list.

Optionally, the access reject message includes an access reject reason identifier, and the access reject reason identifier is used to indicate a reason for rejecting access of the terminal to the dedicated core network.

Before determining the second PLMN based on the DCN indication information, the processor 1101 is further configured to:

determine, based on the access reject reason identifier, that the first PLMN is performing congestion control on the dedicated core network corresponding to the DCN indication information.

Optionally, the second access request further includes a redirection permission identifier.

The redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

Optionally, the DCN indication information is a dedicated core network identifier; or the DCN indication information is a dedicated core network type; or the DCN indication information is a dedicated core network type identifier.

A bus interface may be further included in FIG. 11. The bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit configured to communicate with various other devices on a transmission medium. The processor is responsible for managing a bus architecture and general processing. The memory may store data used when the processor performs an operation.

Based on a same concept, an embodiment of this application provides a radio access network node, configured to perform the foregoing method procedure.

Figure 12:
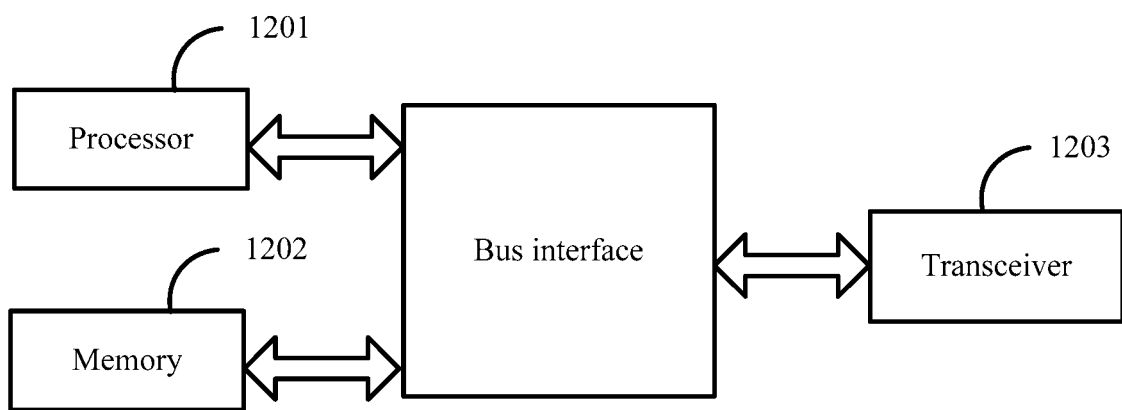
FIG. 12 is a schematic structural diagram of a radio access network node according to an embodiment of this application.

As shown in FIG. 12, FIG. 12 is a schematic structural diagram of a radio access network node according to an embodiment of this application.

Referring to FIG. 12, the radio access network node includes a processor 1201, a memory 1202, and a transmitter 1203.

The transceiver 1203 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof. The processor 1201 may be a central processing unit, a network processor, or a combination of a CPU and an NP. The processor 1201 may further include a hardware chip. The hardware chip may be an application-specific integrated circuit, a programmable logic device, or a combination thereof. The PLD may be a complex programmable logic device, a field-programmable logic gate array, generic array logic, or any combination thereof. The memory 1202 may include a volatile memory, such as a random-access memory. Alternatively, the memory 1202 may include a non-volatile memory, such as a read-only memory, a flash memory, a hard disk drive, or a solid-state drive. Alternatively, the memory 1202 may include a combination of memories of the foregoing types.

The memory 1202 may be configured to store a program.

The transceiver 1203 is configured to receive an access request sent by a terminal. The access request includes dedicated core network DCN indication information, and the access request is used to instruct the radio access network node to connect the terminal and a dedicated core network that is corresponding to the DCN indication information and that is in a first public land mobile network PLMN.

The processor 1201 is configured to: if a first core network node that is corresponding to the dedicated core network and that is in the first PLMN rejects access of the terminal to the dedicated core network corresponding to the DCN indication information, determine a second PLMN based on the DCN indication information, and connect the terminal and a dedicated core network that is corresponding to the DCN indication information and that is in the second PLMN.

Optionally, the processor 1201 is specifically configured to:

send the DCN indication information to the first core network node by using the transceiver; and if a service reject message sent by the first core network node is received, determine that the first core network node rejects access of the terminal to the dedicated core network, where the service reject message is sent by the first core network node after the first core network node determines that congestion control is being performed on the dedicated core network corresponding to the DCN indication information.

Optionally, before receiving the access request sent by the terminal, the transceiver 1203 is further configured to:

receive a congestion control message that includes a congestion control DCN identifier list and that is sent by the first core network node, where the congestion control DCN identifier list is used to instruct the radio access network node to reject access of the terminal to a dedicated core network corresponding to a DCN identifier in the congestion control DCN identifier list.

The processor 1201 is further configured to:

if a DCN identifier of the dedicated core network corresponding to the DCN indication information is in the congestion control DCN identifier list, determine that the first core network node rejects access of the terminal to the dedicated core network corresponding to the DCN indication information.

Optionally, the processor 1201 is specifically configured to:

determine, from N DCN identifier lists, all DCN identifier lists that include a DCN identifier indicated by the DCN indication information, where the N DCN identifier lists are obtained by the radio access network node based on N pieces of received DCN registration information sent by N core network nodes, each piece of DCN registration information includes a PLMN identifier of a core network node that sends the DCN registration information and a DCN identifier list of the core network node, and N is a natural number; and select a PLMN identifier from PLMN identifiers corresponding to all the DCN identifier lists that include the DCN identifier indicated by the DCN indication information, and determine the second PLMN based on the selected PLMN identifier.

Optionally, before the second PLMN is determined based on the DCN indication information, the transceiver 1203 is further configured to:

receive a PLMN identifier list sent by the first core network node, where the PLMN identifier list is used to instruct the radio access network node to select a PLMN identifier from the PLMN identifier list.

The processor 1201 is further configured to:

select, from the PLMN identifiers corresponding to all the DCN identifier lists that include the DCN identifier indicated by the DCN indication information, a PLMN identifier that is in the PLMN identifier list.

Optionally, the access request further includes a redirection permission identifier, and the redirection permission identifier is used to indicate whether the terminal has permission to access, in a cross-PLMN manner, the dedicated core network corresponding to the DCN indication information.

Optionally, before determining the second PLMN based on the DCN indication information, the processor 1201 is further configured to:

determine, based on the redirection permission identifier, that the terminal has the permission to access the DCN in the cross-PLMN manner.

Optionally, after the second PLMN is determined based on the DCN indication information, the transceiver 1203 is further configured to:

forward the redirection permission identifier to a second core network node that is corresponding to the dedicated core network corresponding to the DCN indication information and that is in the second PLMN, so that after determining, based on the redirection permission identifier, that the terminal has the permission to access, in the cross-PLMN manner, the dedicated core network corresponding to the DCN indication information, the second core network node connects the terminal and the dedicated core network.

Optionally, the DCN indication information is a dedicated core network identifier; or the DCN indication information is a dedicated core network type; or the DCN indication information is a dedicated core network type identifier.

A bus interface may be further included in FIG. 12. The bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit configured to communicate with various other devices on a transmission medium. The processor is responsible for managing a bus architecture and general processing. The memory may store data used when the processor performs an operation.

Persons skilled in the art should understand that the embodiments of this application may be provided as a method or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

Although embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to this application without departing from the scope of this application. This application is intended to cover these modifications and variations of this application provided that they fall within the scope of protection defined by the following claims of this application and their equivalent technologies.

What is claimed is:

1. An access method, comprising:
    obtaining, by a terminal, first dedicated core network (DCN) information;
    determining, by the terminal, a first public land mobile network (PLMN) based on the first DCN information and dedicated core network DCN indication information;
    sending, by the terminal, a first access request to the first PLMN, wherein the first access request comprises the DCN indication information, and wherein the first access request is used to request to access a dedicated core network that is corresponding to the DCN indication information and that is in the first PLMN;
    receiving, by the terminal, an access reject message sent by the first PLMN, wherein the access reject message is used to reject access of the terminal to the dedicated core network that is corresponding to the DCN indication information and that is in the first PLMN;
    determining, by the terminal, a second PLMN based on the DCN indication information; and
    sending, by the terminal, a second access request to the second PLMN, wherein the second access request comprises the DCN indication information, and wherein the second access request is used to request to access a dedicated core network that is corresponding to the DCN indication information and that is in the second PLMN.

2. The method according to claim 1, wherein the obtaining, by a terminal, first dedicated core network DCN information comprises:
    receiving, by the terminal, the first DCN information sent by a radio access network node in the first PLMN, wherein the first DCN information comprises N DCN identifier lists and N PLMN identifiers corresponding to the N DCN identifier lists, wherein any PLMN identifier is used to indicate a PLMN to which a DCN identifier list corresponding to the PLMN identifier belongs, and wherein N is a natural number.

3. The method according to claim 2, wherein the determining, by the terminal, a second PLMN based on the DCN indication information comprises:
    determining, by the terminal from the N DCN identifier lists, all DCN identifier lists that comprise a DCN identifier indicated by the DCN indication information;
    selecting, by the terminal, a PLMN identifier from PLMN identifiers corresponding to all the DCN identifier lists that comprise the DCN identifier indicated by the DCN indication information; and
    determining, by the terminal, the second PLMN based on the selected PLMN identifier.

4. The method according to claim 1, wherein before the determining, by the terminal, a second PLMN based on the DCN indication information, the method further comprises:
    receiving, by the terminal, second DCN information sent by a radio access network node in the second PLMN, wherein the second DCN information comprises M DCN identifier lists and M PLMN identifiers corresponding to the M DCN identifier lists, and wherein M is a natural number; and
    wherein the determining, by the terminal, a second PLMN based on the DCN indication information comprises:
    determining, by the terminal from the M DCN identifier lists, all DCN identifier lists that comprise a DCN identifier indicated by the DCN indication information; and
    selecting, by the terminal, a PLMN identifier from PLMN identifiers corresponding to all the DCN identifier lists that comprise the DCN identifier indicated by the DCN indication information; and
    determining, by the terminal, the second PLMN based on the selected PLMN identifier.

5. The method according to claim 4, wherein the access reject message comprises a PLMN identifier list, and wherein the PLMN identifier list is used to instruct the terminal to select a PLMN identifier from the PLMN identifier list; and
    wherein the selecting, by the terminal, a PLMN identifier from PLMN identifiers corresponding to all the DCN identifier lists that comprise the DCN identifier indicated by the DCN indication information comprises:
    selecting, by the terminal from the PLMN identifiers corresponding to all the DCN identifier lists that comprise the DCN identifier indicated by the DCN indication information, a PLMN identifier that is in the PLMN identifier list.

6. The method according to claim 1, wherein the DCN indication information is one of a dedicated core network identifier,
    a dedicated core network type, or
    a dedicated core network type identifier.

7. A terminal, comprising:
    a transceiver, configured to obtain first dedicated core network (DCN) information; and
    at least one processor, the at least one processor configured to:
        determine a first public land mobile network (PLMN) based on the first DCN information and dedicated core network DCN indication information; and
        send a first access request to the first PLMN by using the transceiver, wherein the first access request comprises the DCN indication information, and wherein the first access request is used to request to access a dedicated core network that is corresponding to the DCN indication information and that is in the first PLMN;
    the transceiver is configured to receive an access reject message sent by the first PLMN, wherein the access reject message is used to reject access of the terminal to the dedicated core network that is corresponding to the DCN indication information and that is in the first PLMN; and
    the at least one processor is configured to:
        determine a second PLMN based on the DCN indication information; and send a second access request to the second PLMN by using the transceiver, wherein the second access request comprises the DCN indication information, and wherein the second access request is used to request to access a dedicated core network that is corresponding to the DCN indication information and that is in the second PLMN.

8. The terminal according to claim 7, wherein the transceiver is configured to:
receive the first DCN information sent by a radio access network node in the first PLMN, wherein the first DCN information comprises N DCN identifier lists and N PLMN identifiers that have a correspondence, wherein any PLMN identifier is used to indicate a PLMN to which a DCN identifier list corresponding to the PLMN identifier belongs, and wherein N is a natural number.

9. The terminal according to claim 7, wherein before the second PLMN is determined based on the DCN indication information, the transceiver is further configured to:
receive second DCN information sent by a radio access network node in the second PLMN, wherein the second DCN information comprises M DCN identifier lists and M PLMN identifiers corresponding to the M DCN identifier lists, and wherein M is a natural number; and wherein the at least one processor is configured to:
determine, from the M DCN identifier lists, all DCN identifier lists that comprise a DCN identifier indicated by the DCN indication information; and
select a PLMN identifier from PLMN identifiers corresponding to all the DCN identifier lists that comprise the DCN identifier indicated by the DCN indication information; and
determine the second PLMN based on the selected PLMN identifier.

10. The terminal according to claim 7, wherein the second access request further comprises a redirection permission identifier, wherein the redirection permission identifier is used to indicate to the second PLMN whether the terminal has permission to access, in a cross-PLMN manner, the dedicated core network corresponding to the DCN indication information, so that after determining, based on the redirection permission identifier, that the terminal has the permission to access, in the cross-PLMN manner, the dedicated core network corresponding to the DCN indication information, the second PLMN connects the terminal and the dedicated core network corresponding to the DCN indication information.

* * * * *